(12) United States Patent
Grimes et al.

(10) Patent No.: US 11,633,896 B2
(45) Date of Patent: Apr. 25, 2023

(54) INTERFACE DEVICE, COLORING AGENT AND METHOD FOR IMPARTING COLOR TO FOOD MATERIAL

(71) Applicants: Brenda Marie Grimes, Naples, FL (US); Charles Wilson Grimes, Naples, FL (US)

(72) Inventors: Brenda Marie Grimes, Naples, FL (US); Charles Wilson Grimes, Naples, FL (US)

( * ) Notice: Subject to any disclaimer, the term of this patent is extended or adjusted under 35 U.S.C. 154(b) by 0 days.

(21) Appl. No.: 16/824,515

(22) Filed: Mar. 19, 2020

(65) Prior Publication Data

US 2020/0215736 A1 Jul. 9, 2020

Related U.S. Application Data

(60) Continuation-in-part of application No. 16/358,399, filed on Mar. 19, 2019, now abandoned, and a
(Continued)

(51) Int. Cl.
| | |
|---|---|
| *B29C 48/12* | (2019.01) |
| *A21C 15/00* | (2006.01) |
| *B29C 48/30* | (2019.01) |
| *B29C 48/09* | (2019.01) |
| *B29C 48/13* | (2019.01) |
| *A23G 3/28* | (2006.01) |

(52) U.S. Cl.
CPC .......... *B29C 48/12* (2019.02); *A21C 15/005* (2013.01); *B29C 48/09* (2019.02); *B29C 48/13* (2019.02); *B29C 48/30* (2019.02); *A23G 3/28* (2013.01); *Y10S 425/044* (2013.01)

(58) Field of Classification Search
CPC ........ A21C 15/005; A23G 3/28; B29C 48/12; B29C 48/30; B29C 48/13; B29C 48/09; B29C 48/3001; B29C 48/022; Y10S 425/044
See application file for complete search history.

(56) References Cited

U.S. PATENT DOCUMENTS

| | | | |
|---|---|---|---|
| 2,320,496 A | 6/1943 | Wechsler | |
| 2,539,944 A * | 1/1951 | Bury | ......... A23G 3/28 425/191 |

(Continued)

FOREIGN PATENT DOCUMENTS

| | | |
|---|---|---|
| WO | 2004/049816 A1 | 6/2004 |
| WO | 2005/115162 A1 | 12/2005 |
| WO | 2007/090588 A1 | 8/2007 |

OTHER PUBLICATIONS

"Pastry Bag Support", Kitchen Krafts, The Foodcrafter's Supply Catalog, retrieved date Jan. 2, 2011, retrieved from URL:http://www.kitchenkrafts.com/product.asp?pn-CD3013&utm_medium=shoppingengine*utm_source=shopzilla&SID=Shopzilla&tid=CSE, 1pg.
(Continued)

*Primary Examiner* — Seyed Masoud Malekzadeh

(57) ABSTRACT

An interface device, coloring agent and method for imparting color to food material during the decorating of foods. This interface device, coloring agent and method for imparting color to food material during the decorating of foods can be used to impart color from solid, liquid or semi-liquid coloring compounds to a wide variety of food material such as frosting and icing.

5 Claims, 21 Drawing Sheets

Related U.S. Application Data continuation-in-part of application No. 15/804,801, filed on Nov. 6, 2017, now Pat. No. 10,315,348, and a continuation-in-part of application No. 13/852,507, filed on Mar. 28, 2013, now Pat. No. 9,808,977, and a division of application No. 13/366,863, filed on Feb. 6, 2012, now Pat. No. 8,790,110, and a continuation-in-part of application No. 13/184,021, filed on Jul. 15, 2011, now Pat. No. 8,794,959.

(56) References Cited

U.S. PATENT DOCUMENTS

| | | |
|---|---|---|
| 2,723,779 A | 11/1955 | Parker et al. |
| 2,959,327 A | 11/1960 | Bloom |
| 4,598,844 A | 7/1986 | Morris |
| 4,961,517 A | 10/1990 | Tkac |
| 5,114,044 A * | 5/1992 | Spanek, Jr. .......... A21C 15/005 383/906 |
| 5,248,071 A | 9/1993 | Ray |
| 5,538,050 A | 7/1996 | Galdon |
| 5,758,802 A | 6/1998 | Wallays |
| 5,787,947 A | 8/1998 | Hertsgaard |
| 5,931,346 A | 8/1999 | Wallays |
| 6,065,651 A | 5/2000 | Tedeschi, Jr. et al. |
| 6,273,307 B1 | 8/2001 | Gross et al. |
| 6,386,395 B1 | 5/2002 | Lunghetti |
| 7,021,505 B2 | 4/2006 | Franczyk |
| D606,882 S | 12/2009 | Sharp et al. |
| 2004/0112915 A1* | 6/2004 | Franczyk ............. A21C 15/005 222/569 |
| 2007/0131713 A1 | 6/2007 | Hill |
| 2012/0294667 A1* | 11/2012 | Krcma .................... A23G 3/28 401/160 |

OTHER PUBLICATIONS

"Disposable Decorating Bags & Nozzles", Hutzler, retrieved date Jan. 2, 2011, retrieved from URL:http://www.hutzlerco.com/products/i/246/, 1pg.

* cited by examiner

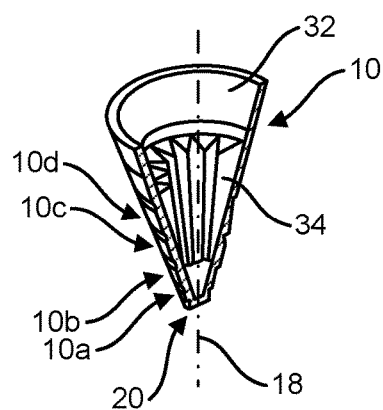
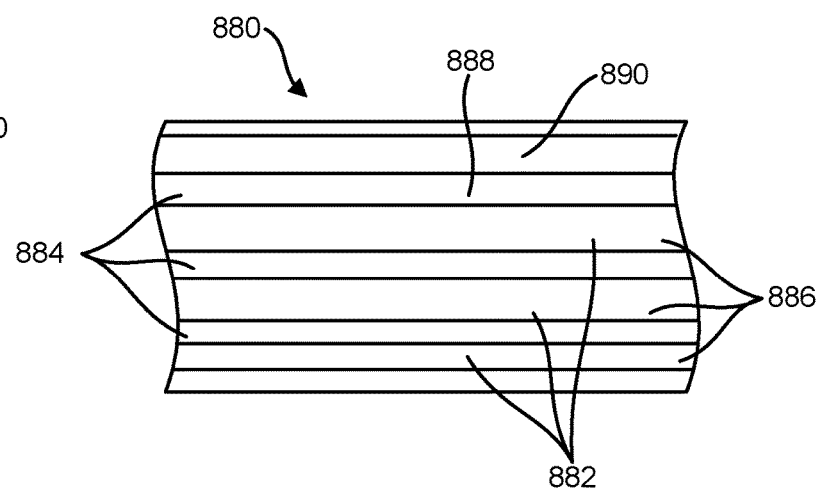
FIG. 1  FIG. 2
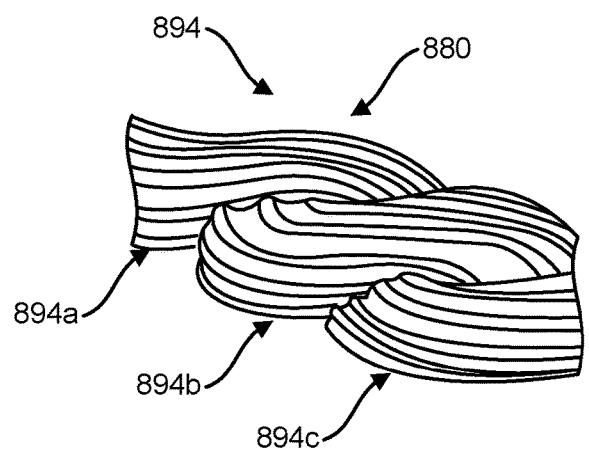
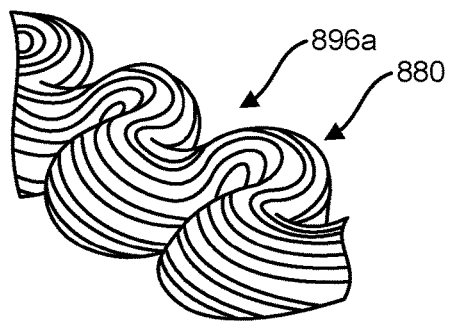
FIG. 3  FIG. 4

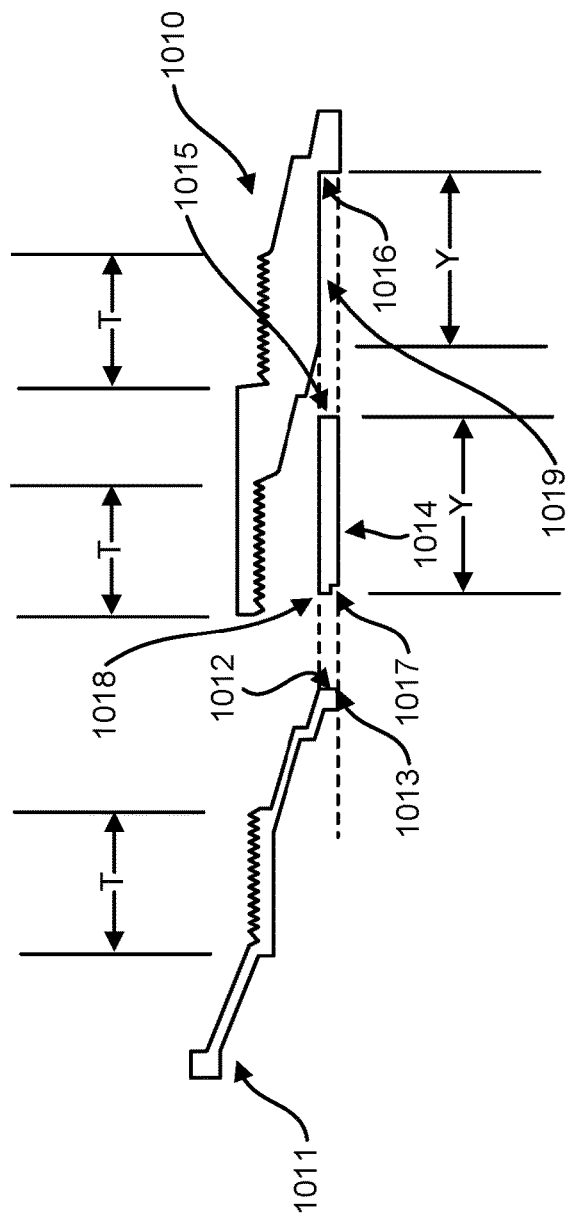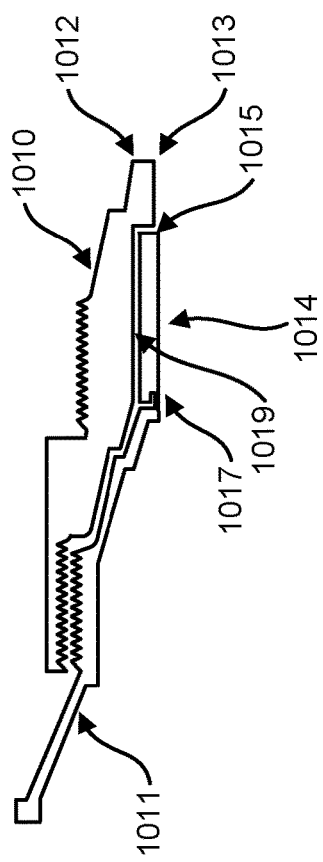

INTERFACE DEVICE, COLORING AGENT AND METHOD FOR IMPARTING COLOR TO FOOD MATERIAL

CROSS-REFERENCE TO RELATED APPLICATIONS

This application is a continuation-in-part of U.S. patent application Ser. No. 16/358,399, filed on Mar. 19, 2019 (now abandoned), which is a continuation-in-part of U.S. patent application Ser. No. 15/804,801, filed on Nov. 6, 2017 (issued on Jun. 11, 2019 as U.S. Pat. No. 10,315,348), which is a continuation-in-part of U.S. patent application Ser. No. 13/852,507, filed on Mar. 28, 2013 (issued on Nov. 7, 2017 as U.S. Pat. No. 9,808,977), which is a divisional of U.S. patent application Ser. No. 13/366,863, filed on Feb. 6, 2012 (issued on Jul. 29, 2014 as U.S. Pat. No. 8,790,110), which is a continuation-in-part of U.S. patent application Ser. No. 13/184,021, filed on Jul. 15, 2011 (issued on Aug. 5, 2014 as U.S. Pat. No. 8,794,959). The entire disclosures of those applications are hereby incorporated herein by reference. Collectively, such prior filings are referred to herein as the "Parent Filings".

BACKGROUND OF THE INVENTION

If a person wants to create an output with multiple colors, i.e., a stream of food material with sides having different colors, the person could use a cumbersome apparatus such as the Wilton ColorSwirl™ 3 Color Coupler, 411-1992. The aforementioned Wilton device requires the use of multiple bags of colored frosting, brought together with a multi-channel coupler. This device, wherein the user is effectively expected to simultaneously handle multiple bags of colored frosting, is cumbersome and unwieldy. Further, such apparatus does not allow for the easy interchangeability of colors mid-output, i.e., if the user wants to stop mid-output, and change one (or more) of the output colors, the user disassembles such apparatus and removes and replaces one (or more) of the bags of colored frosting.

Alternatively, the person could use a traditional pastry bag, coupler plug, nozzle and mating coupler collar, i.e., a traditional Disposable Decorating Bag ("DDB") apparatus, and "stripe" the bag with coloring gels on the internal wall of the bag in a well-known manner, before insertion of the food material, in order to impart color to the food material upon extrusion. Such "striping" methods do not allow for interchangeability of colors mid-output, nor do they allow for replacement/replenishment of the coloring agents, i.e., if the food coloration becomes too diluted, mid-output.

If a person wants to create an output with a three-dimensional ribbon candy design, i.e., a stream of food material with channels having alternating stripes of color on the channel peaks and in the channel valleys, it is not possible with either the aforementioned Wilton Color-Swirl™ device or with any prior art DDB apparatus and the aforementioned "striping" method.

Prior art references concerning decorating, dispensing and icing bags do not disclose the unique features or advantages of this invention. Patents noted but not believed to be relevant to the novelty or non-obviousness of this invention include: Parker et al. U.S. Pat. No. 2,723,779; DeLorimiere U.S. Pat. No. 4,844,917; Tkac U.S. Pat. No. 4,961,517; Wallays U.S. Pat. No. 5,758,802; Wallays U.S. Pat. No. 5,931,346; Tedeschi, Jr. et al. U.S. Pat. No. 6,065,651; Gross et al. U.S. Pat. No. 6,273,307 B1; Lunghetti U.S. Pat. No. 6,386,395 B1; Franczyk U.S. Pat. No. 7,021,505 B2; Folkmar PCT No. WO 2004/049816 A1; Ejeblad PCT No. WO 2005/115162 A1; and Ejeblad PCT No. WO 2007/090588 A1 and the various prior art references heretofore cited in connection with the prosecution of the Parent Filings.

SUMMARY OF THE INVENTION

This invention pertains to an interface device and a coloring agent which are novel and unique. This invention also pertains to an interface plug, a nozzle, a mating interface collar, an extender and a mating extender collar, all of which are novel and unique. The interface plug, interface collar, extender and extender collar are similar in concept to certain components of previous DDB apparatus, but they are each different in terms of construction and manner of operation. Similarly, while the nozzle is a modified version of the nozzle disclosed in FIG. 2 of U.S. Pat. No. 8,794,959, it is different in terms of construction and manner of use. Finally, this invention also pertains to a unique combination of: (i) a pastry bag preloaded with frosting and the interface plug of this invention; (ii) the interface device of this invention; (iii) the coloring agent of this invention; (iv) the nozzle of this invention; and (v) the interface collar of this invention.

The interface device is designed to carry the coloring agent which is inserted into the interface device: (1) after manufacture of the interface device; and (2) either: (a) before commencement of use of the interface device; and/or (b) during use of the interface device.

The interface device can be either a one-piece device or a two-piece device.

The coloring agent in a first embodiment is similar in concept to coloring tablets used to color Easter eggs, except that rather than dissolving in a water and vinegar solution into which an egg is deposited in order to color the egg's exterior, the solid coloring agent is placed in the interface device and the solid coloring agent applies color to the outer surface of the food material as it passes through the interface device and rubs up against the solid coloring agent. The solid coloring agent is arcuate in shape. It can be either in the shape of a one-piece annular ring or it can be a desired number of arcuate chips (or tablets).

The coloring agent in a second embodiment is a viscous coloring material which is placed in an arcuate shaped carrier. The carrier can either be a one-piece annular shape or it can be one or more arcuate carriers, in lieu, respectively, of the solid annular ring or solid arcuate chips (or tablets) of the first embodiment. The viscous coloring material in the carrier is covered during manufacture by a sealing strip which remains on the carrier until use. Before use, a tab attached to the sealing strip is pulled, to thereby remove the sealing strip and expose the viscous coloring material. As the food material passes through the interface device the food material rubs up against the viscous coloring material contained in the annular or arcuate carriers and the outer surface of the food material is "colored" by the viscous coloring material.

The coloring agent in either embodiment is deposited on a seat on the internal wall of the interface device. In one alternative, when the interface device is a one-piece construction, the coloring agent is held on the seat by means of a surface of the interface plug of this invention which, once the interface device is attached to the interface plug, opposes, presses on and holds the coloring agent on the seat on the internal wall of the interface device. In another alternative, when the interface device is a two-piece construction, the interface device includes a pocket, formed by the two pieces of the interface device and into which the coloring agent is inserted.

In a first embodiment of this invention, the inventive interface device and the inventive coloring agent of this invention are used with a traditional DDB coupler plug and mating coupler collar, i.e., with the components of previous DDB apparatus. The inventive interface device, loaded with the inventive coloring agent, is interposed between the traditional DDB coupler plug and the mating coupler collar. The mating coupler collar attaches a traditional nozzle to the interface device.

In a second embodiment of this invention, the inventive interface device and the inventive coloring agent of this invention are used with an inventive interface plug of this invention and a traditional DDB mating coupler collar. The inventive interface device, loaded with the inventive coloring agent, is interposed between the inventive interface plug and the traditional DDB mating coupler collar which attaches a traditional nozzle to the inventive interface device. When the inventive interface device is attached to the inventive interface plug, the inventive coloring agent is locked in place within the inventive interface device in the previously described manner as a result of the aforementioned interaction of the seat of the inventive interface device and the surface of the inventive interface plug.

In a third embodiment of this invention, the inventive interface device and the inventive coloring agent of this invention are designed to be used with a traditional DDB coupler plug, an inventive interface collar of this invention and an inventive nozzle of this invention, which is a modified version of the nozzle disclosed in FIG. 2 of U.S. Pat. No. 8,794,959. The inventive interface device, loaded with the inventive coloring agent, is interposed between the traditional DDB coupler plug and the inventive interface collar which attaches the inventive nozzle to the inventive interface device.

In a fourth embodiment of this invention, the inventive interface device and the inventive coloring agent of this invention are designed to be used with a traditional DDB coupler plug, the inventive interface collar, an inventive extender and mating extender collar of this invention, and a conventional, commercially available nozzle. The inventive interface device, loaded with the inventive coloring agent, is interposed between the traditional DDB coupler plug and the inventive interface collar which attaches the inventive extender to the inventive interface device. The mating extender collar attaches a traditional nozzle to the inventive extender. This permits the use of the invention with the plethora of commercially available traditional nozzles.

In a fifth embodiment of this invention, the inventive interface device and the inventive coloring agent of this invention are designed to be used with an inventive interface plug of this invention, an inventive interface collar of this invention and an inventive nozzle of this invention, which is a modified version of the nozzle disclosed in FIG. 2 of U.S. Pat. No. 8,794,959. The inventive interface device, loaded with the inventive coloring agent, is interposed between the inventive interface plug and the inventive interface collar. When the inventive interface device is attached to the inventive interface plug, the inventive coloring agent, whether an annular ring, arcuate tablets, an annular carrier or arcuate carriers, is locked in place within the inventive interface device as a result of the aforementioned interaction of the seat of the inventive interface device and the opposing surface of the inventive interface plug. The inventive interface collar attaches the inventive nozzle to the inventive interface device. The inventive coloring agent applies color to outer surface of the food material as it passes through the inventive interface device. The inwardly extending serrations or ridges of the inventive nozzle cause the material to be "treated" as it is expelled to yield a three-dimensional ribbon candy design, i.e., a stream of food material with channels having alternating stripes of color on the channel peaks and in the channel valleys. Thus, in the fifth and preferred embodiment, when the inventive interface device and inventive coloring agent of this invention are used with the inventive interface plug, inventive interface collar and inventive nozzle, the user can: (a) create an output with multiple colors; (b) create an output with channels having alternating stripes of color on the channel peaks and in the channel valleys; (c) stop mid-output and change the coloring agent(s); and (d) stop mid-output and replenish the coloring agent(s).

In a sixth embodiment of this invention, which is a modified version of the fifth embodiment, the inventive interface plug is preloaded into a pastry bag together with frosting. The pastry bag with the inventive interface plug and frosting is sealed after manufacture and before distribution to the consumer. The consumer opens the sealed pastry bag, exposing the inventive interface plug, to which the inventive interface device can then be attached. A similar prior art preloaded pastry bag, albeit with a tip rather than a plug, is the "Filled Pastry Bag" of Pillsbury, which can be seen at: https://www.pillsburybaking.com/products/pastry-bag/vanilla.

In another embodiment of this invention, an inventive loading stand of this invention can be used to assist in placing the inventive coloring agent in the inventive interface device.

The method of this invention in one embodiment involves first placing the inventive coloring agent into the inventive interface device, then interposing the inventive interface device between a traditional DDB coupler plug placed in a pastry bag and mating coupler collar, such as a coupler plug and a mating coupler collar combination manufactured by August Thomsen Corporation, Wilton Brands, Inc., Hutzler Manufacturing Co., Inc. or Kitchen Krafts, Inc.

In another embodiment, the method of this invention involves first placing the inventive coloring agent into the inventive interface device, then attaching the inventive interface device to an inventive interface plug of this invention placed in a pastry bag, and attaching an inventive nozzle, manufactured in accordance with the teachings of U.S. Pat. No. 8,794,959 and of this invention, to the inventive interface device using the inventive interface collar of this invention.

In an alternative embodiment, the method of this invention involves first placing the inventive coloring agent into the inventive interface device, then attaching the inventive interface device to either a traditional DDB coupler plug or an inventive interface plug of this invention, placed in a pastry bag, attaching an inventive extender of this invention to the inventive interface device using the inventive interface collar of this invention, and then finally attaching a traditional nozzle to the inventive extender using the extender collar of this invention.

In yet another embodiment of this invention, the method of this invention involves first placing the inventive coloring agent into the inventive interface device, then attaching the inventive interface device to an inventive interface plug of this invention which has been preloaded into a pastry bag, by first tearing a seal off the pastry bag and exposing the inventive interface plug, and then attaching an inventive nozzle, manufactured in accordance with the teachings of U.S. Pat. No. 8,794,959 and of this invention, to the inventive interface device using the inventive interface collar of this invention.

In all embodiments of the method, the pastry bag is filled with frosting, the frosting is extruded out the bag and the interface plug, through the inventive interface device where the outer surface of the frosting is colored by the inventive coloring agent in the inventive interface device, and then the frosting is extruded out through either the nozzle manufactured in accordance with the teachings of U.S. Pat. No. 8,794,959 and of this invention or a traditional nozzle.

Because the coloring agent is not mounted during manufacture of the inventive interface device, but rather, inserted into the inventive interface device after manufacture of the inventive interface device and before use of the inventive interface device, the components of this invention, namely: (i) the interface device; (ii) the interface plug; (iii) the interface collar; (iv) the extender; (v) the extender collar; and (vi) one or more nozzles manufactured in accordance with the teachings of U.S. Pat. No. 8,794,959 and of this invention and having varying size openings permitting varying sizes of output; can be sold together in a package as a re-usable item.

The aforementioned package can include a dishwasher carrier, i.e., a mesh bag or a mesh basket, many variants of which are currently commercially available. The carrier would insure that the various component pieces do not fall into the bottom of the dishwasher and become lost or enmeshed in the moving parts (the rotating arm) of the dishwasher.

The coloring agents can be sold separately, either in solid annular ring form, solid arcuate chip (or tablet) form, in the form of an annular carrier with viscous coloring material therein, or in the form of arcuate carriers with viscous coloring material therein. Such coloring agents can be sold in the bakery aisle—in much the same way that a selection of colored sprinkles is sold in that aisle. Alternatively, such coloring agents can be sold online, where a greater selection of colors can be inventoried for sale.

The sealed pastry bag prefilled with the inventive interface plug and frosting can be sold in stores like Pillsbury's "Filled Pastry Bag" product or sold online.

As an alternative, a "starter box" of this invention may include the novel and unique components of this invention, namely: (i) the interface device, (ii) the interface plug; (iii) the interface collar; (iv) the extender; (v) the extender collar; and (vi) one or more nozzles manufactured in accordance with the teachings of U.S. Pat. No. 8,794,959 and of this invention and having varying size openings permitting varying sizes of output; together with an introductory selection of coloring agents in whatever form is desired, which will enable the user to immediately use the items in the box to practice the invention upon purchase and to subsequently acquire additional/other coloring agents and re-use the components of this invention, e.g., for different holidays, celebratory occasions, etc. Here again, the "starter box" can include a dishwasher carrier that can be used to insure that the various component pieces do not fall into the bottom of the dishwasher and become lost or enmeshed in the moving parts (the rotating arm) of the dishwasher.

In a final version, the arcuate shaped carriers, i.e., the annular ring or arcuate sections, are refillable. The viscous coloring material is sold separately. The user can refill the arcuate shaped carriers with viscous coloring material before use.

An object of the disclosed invention is to provide an apparatus and method for imparting color to the surface of food material as it is extruded out of a pastry bag.

A further object of the disclosed invention is to provide an apparatus and method for imparting color to the surface of food material as it is extruded out of a pastry bag, and to provide for replenishment of the coloring agent in the apparatus mid-output.

A further object of the disclosed invention is to provide an apparatus and method for imparting color to the outer surface of food material as it is extruded out of a pastry bag, and to provide for replacing of the coloring agent with a different color mid-output.

A further object of the disclosed invention is to provide an apparatus and method that can enable the imparting of two or more colors to the outer surface of food material as it is extruded out of a pastry bag.

A further object of the disclosed invention is to provide an apparatus and method that can enable the imparting of two or more colors to the outer surface of food material as it is extruded out of a pastry bag, and to provide for replenishment of one or more of the coloring agents mid-output.

A further object of the disclosed invention is to provide an apparatus and method that can enable the imparting of two or more colors to the outer surface of food material as it is extruded out of a pastry bag, and to provide for replacing of one or more of the coloring agents mid-output.

A still further object of this invention is to provide an interface device which can be used with a traditional DDB coupler plug and coupler collar.

A still further object of this invention is to provide an interface device which can be used with a pastry bag preloaded with frosting and an interface plug.

A still further object of this invention to provide an interface device which can be used with a nozzle which has protrusions, serrations or ridges extending inwardly from the internal wall and running longitudinally or parallel along the length of the nozzle in accordance with the teachings of U.S. Pat. No. 8,794,959, such that the inwardly extending protrusions, serrations or ridges cut into the food material, causing the food material to split into alternating stripes of food material that: (a) has been in contact with the coloring agent on the internal wall of the interface device and displays the effects of the coloring agent on the food material as it is expelled out through the nozzle; and (b) has not been in contact with the coloring agent on the internal wall of the interface device and passes out through the nozzle without displaying any effect from the coloring agent.

A still further object of this invention is to provide an interface device which can be used with a coloring agent which is placed in the interface device, an interface plug which locks the coloring agent in place in the interface device when the interface device is attached to the interface plug, an interface collar which affixes a nozzle to the interface device, which nozzle has protrusions, serrations or ridges extending inwardly from the internal wall and running longitudinally or parallel along the length of the nozzle in accordance with the teachings of U.S. Pat. No. 8,794,959, such that the user can create an output with a three-dimensional ribbon candy design, i.e., a stream of food material with channels having alternating stripes of color on the channel peaks and channel valleys, both initially when the interface device is attached to the interface plug, and subsequently when, without difficulty, the interface device—interface plug attachment is "opened" and the coloring agent (be it an annular ring, arcuate chips or tablets, an annular shaped carrier with coloring material or arcuate shaped carriers with coloring material) is replenished and/or replaced and the interface device—interface plug attachment is "closed."

A final object of this invention to provide refillable arcuate shaped carriers, i.e., the annular ring or arcuate sections, are refillable. The viscous coloring material is sold separately. The user can refill the arcuate shaped carriers with viscous coloring material before use.

BRIEF DESCRIPTION OF THE FIGURES

FIG. 1 depicts a sectional view of a nozzle which has protrusions, serrations or ridges extending inwardly from the internal wall and running longitudinally or parallel along the length of the nozzle in accordance with the teachings of U.S. Pat. No. 8,794,959 that, once modified in accordance with the teachings of this invention, i.e., to incorporate a flange 412 as shown in FIG. 10, can be used with the interface device of this invention.

FIG. 2 is a top plan view of a stream of food material expelled from the apparatus of this invention with a three-dimensional ribbon candy appearance.

FIG. 3 and FIG. 4 are prospective views of streams of food material produced with the apparatus of this invention with a three-dimensional ribbon candy appearance and, through the manipulation of the apparatus during expulsion, having different and unique decorating designs.

FIG. 21 is an exploded sectional view of an alternative embodiment of the one-piece interface device of this invention shown in FIGS. 9A, 9B and 9C, which can be used, after insertion of solid quarter round coloring tablets or a solid annular coloring ring, with an alternative embodiment of the interface plug of this invention shown in FIGS. 8A, 8B and 8C, i.e., the surface on the end of such interface plug which engages the solid tablets or solid ring is notched to cooperatively engage with a mating notch in the solid tablets or solid ring.

FIG. 22 is a sectional view of the assembled interface device shown in FIG. 21.

FIG. 25A is a sectional view of a possible modified solid coloring arcuate tablet or modified solid coloring annular ring 1034A and a possible modified seat 1037A of this invention shown in FIG. 24.

Figure 26:
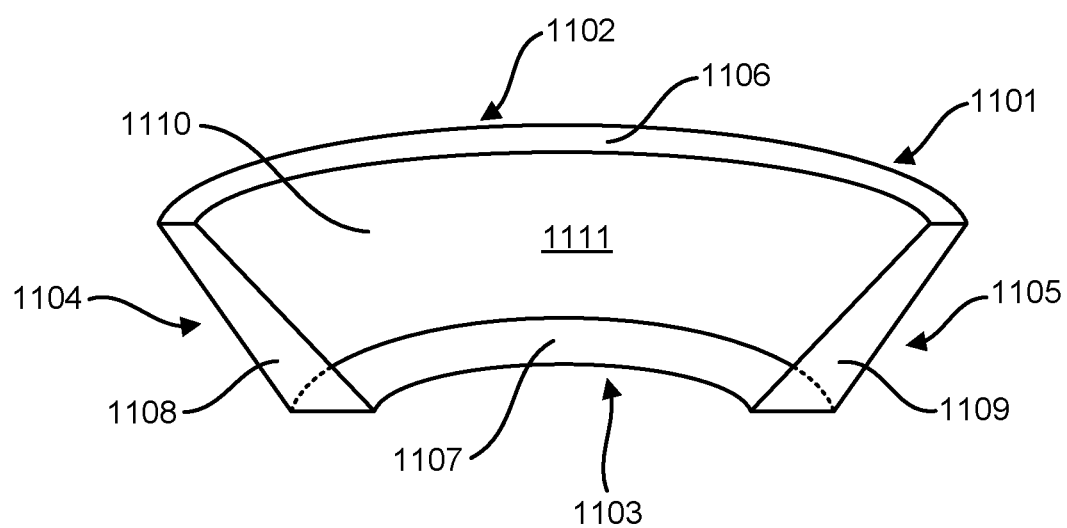
FIG. 26 is an arcuate shaped carrier for a viscous coloring agent, which carrier can be an annular ring (not shown here but shown in FIG. 29) or an arcuate shaped section (as shown here and in FIG. 30), so that the cavity of such carrier is in the shape of either the solid annular coloring ring or the solid arcuate coloring tablet respectively shown in FIGS. 16A, 16B and 16C and FIG. 17.
Figure 29:
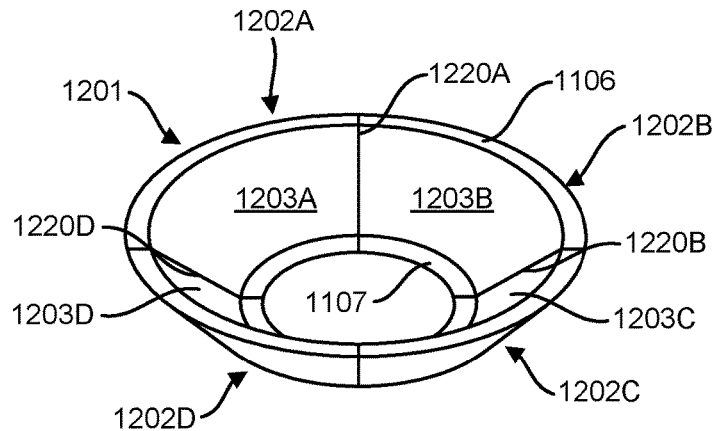
Figure 30:
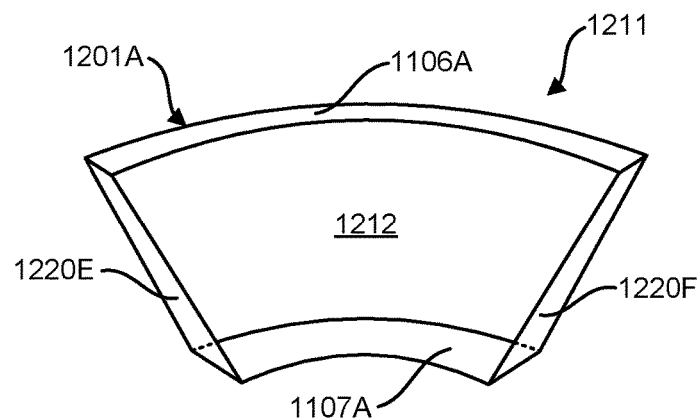

A seal, not shown in FIG. 26 or any of the other FIGS., most notably, FIGS. 29 and 30, but shown and fully described in the Parent Filings incorporated herein by reference (see. e.g., FIGS. 29 and 30 of U.S. Pat. No. 10,315,348 and Col. 13, lines 45 et seq.) is attached to the carrier during manufacture after the viscous coloring material has been inserted, to protect the viscous coloring material until ready for use. When ready for use, a tab attached to the seal is pulled to remove the seal and expose the viscous coloring material.

Figure 27:
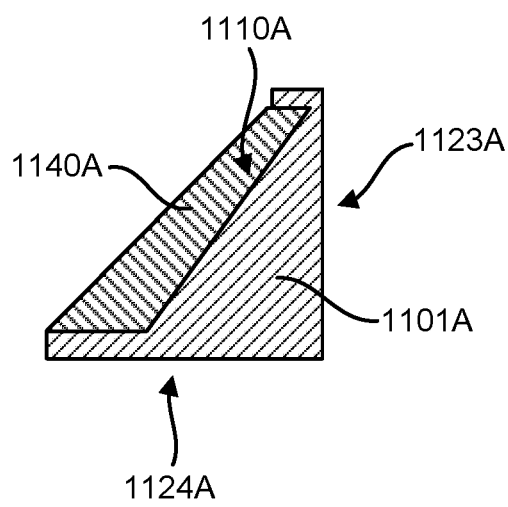
Figure 28:
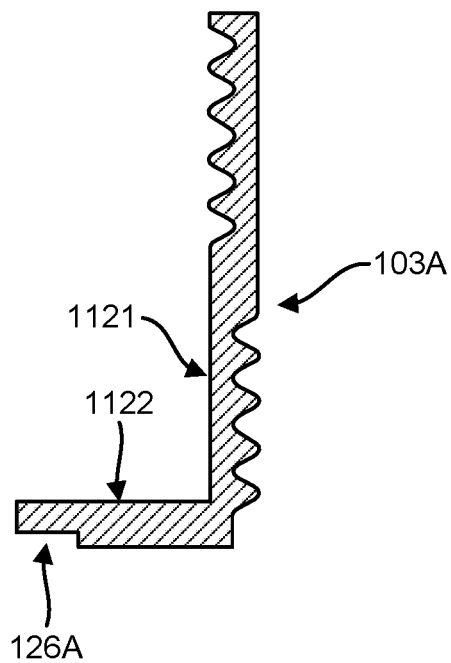

FIG. 27 is a cross sectional view of the carrier of FIG. 26, modified so that the internal wall is the same shape as the back wall of the solid annular coloring ring or the arcuate coloring tablet respectively shown in FIGS. 16A, 16B and 16C and FIG. 17, but the carrier has a filler and a squared off back wall which facilitates insertion of the carrier into the interface device shown in FIG. 28.

Figure 25A:
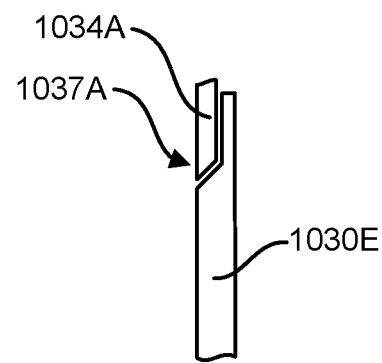
FIG. 25A is a blow up of the portion of FIG. 24 which is encircled, namely, seat 1037 and solid color tablet (or solid ring) 1034 of FIG. 24. More specifically.
Figure 25B:
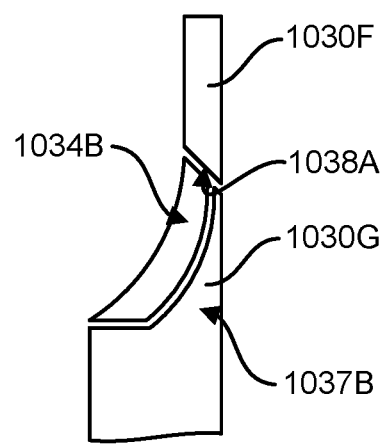
FIG. 25B is a sectional view of a possible modified shape solid arcuate coloring tablet or modified shape solid annular coloring ring 1034B and a conformingly modified interface device of this invention.
Figure 27A:
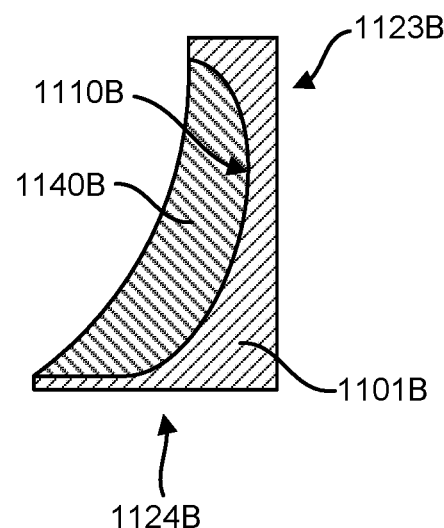

FIG. 27A is a cross sectional view of a modified version of the carrier of FIG. 27, i.e., with the internal wall modified to be the same as the back wall of the coloring tablet or annular ring of FIG. 25B.

Figure 25C:
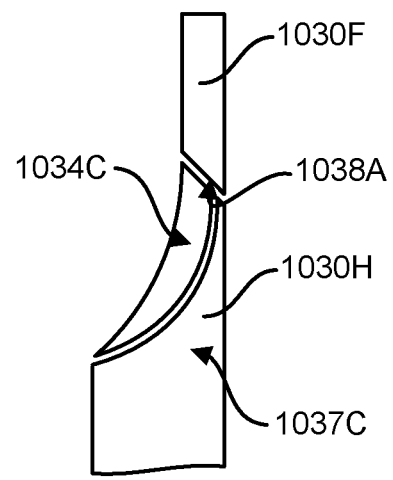
FIG. 25C is a sectional view of another possible modified shape solid arcuate coloring tablet or modified shape solid annular coloring ring 1034C and another conformingly modified interface device of this invention.
Figure 27B:
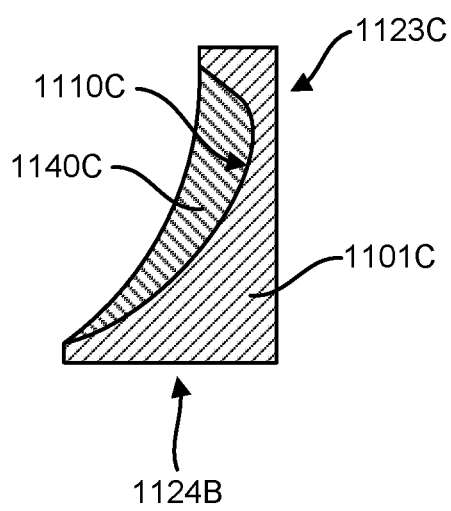

FIG. 27B is a cross sectional view of a modified version of the carrier of FIG. 27, i.e., with the internal wall modified to be the same as the back wall of the coloring tablet or annular ring of FIG. 25C.

Figure 6:
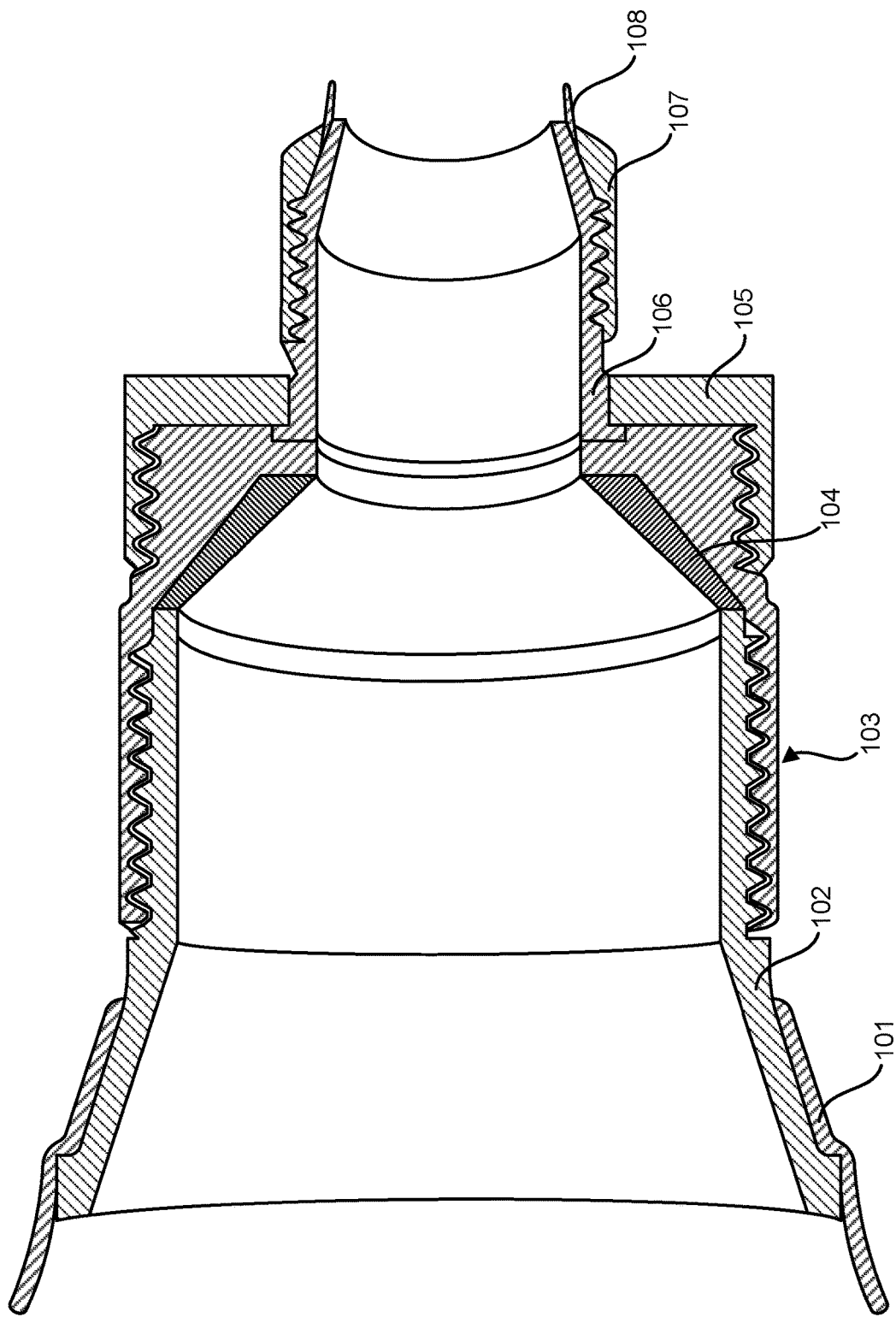
FIGS. 6 and 7 depict sectional views of a pastry bag, an interface plug, an interface device, an inserted coloring agent, an interface collar, an extender, a traditional nozzle and an extender collar of this invention.
Figure 7:
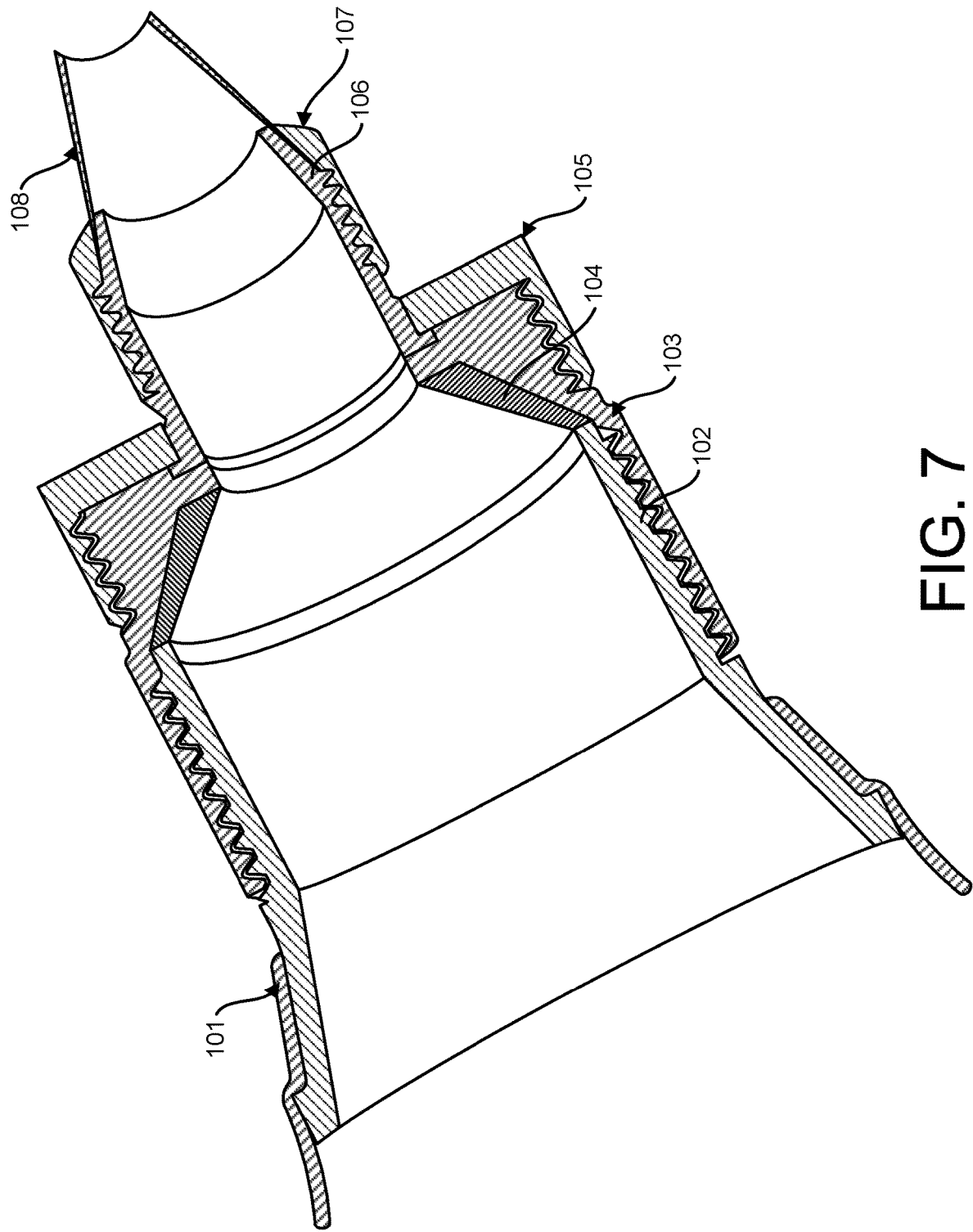
Figure 9A:
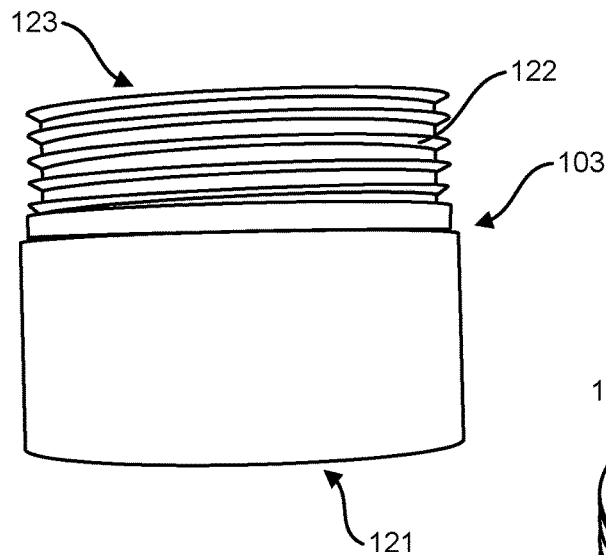
FIGS. 9A, 9B and 9C, respectively, show a side view, a prospective view and a sectional view of the interface device of this invention shown in FIGS. 6 and 7.

FIG. 28 is a cross sectional view of a modified version of the interface device of FIGS. 6, 7, and 9A, B and C, with internal walls adapted to easily receive and hold the carriers of FIG. 27, 27A or 27B.

FIG. 29 is a modified version of the carrier of FIG. 26, namely, an annular carrier having four separate internal cavities which can receive four separate and distinct viscous coloring agents. As noted above, a seal, not shown in this FIG. 29 but shown and fully described in the Parent Filings incorporated herein by reference (see. e.g., FIGS. 29 and 30 of U.S. Pat. No. 10,315,348 and Col. 13, lines 45 et seq.), is attached to the carrier during manufacture after the viscous coloring material has been inserted, to protect the viscous coloring material until ready for use. When ready for use, a tab attached to the seal is pulled to remove the seal and expose the viscous coloring material.

FIG. 30 is a modified version of the carrier of FIG. 26, namely, a quarter-round carrier, which has a cavity which can receive a viscous coloring agent, and which has an outer dimension which allows it to be seated, along with three other similar quarter-round carriers, in a modified version of the carrier of FIG. 29, i.e., in which first axial side wall 1106 is eliminated so that the quarter round carrier of FIG. 30 can be inserted in, i.e., dropped into, one of the cavities of the carrier of FIG. 29. As noted above, a seal, not shown in this FIG. 30 but shown and fully described in the Parent Filings incorporated herein by reference (see. e.g., FIGS. 29 and 30 of U.S. Pat. No. 10,315,348 and Col. 13, lines 45 et seq.), is attached to the carrier during manufacture after the viscous coloring material has been inserted, to protect the viscous coloring material until ready for use. When ready for use, a tab attached to the seal is pulled to remove the seal and expose the viscous coloring material.

Figure 16A:
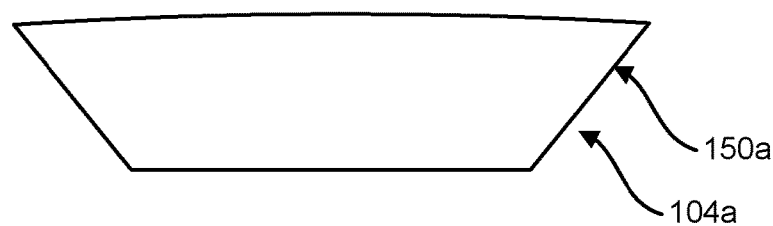
FIGS. 16A, 16B and 16C, respectively, show a side view, a prospective view and a sectional view of the arcuate shaped solid coloring agent of this invention—more specifically, in these FIGS. an annular solid coloring agent ring is shown.
Figure 16B:
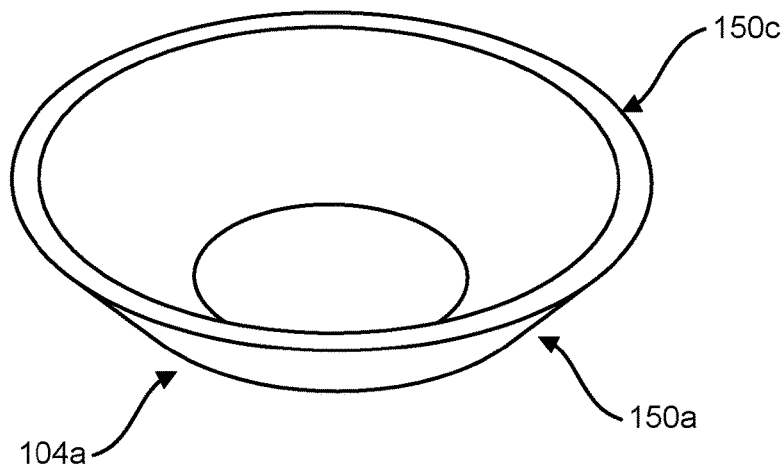
Figure 16C:
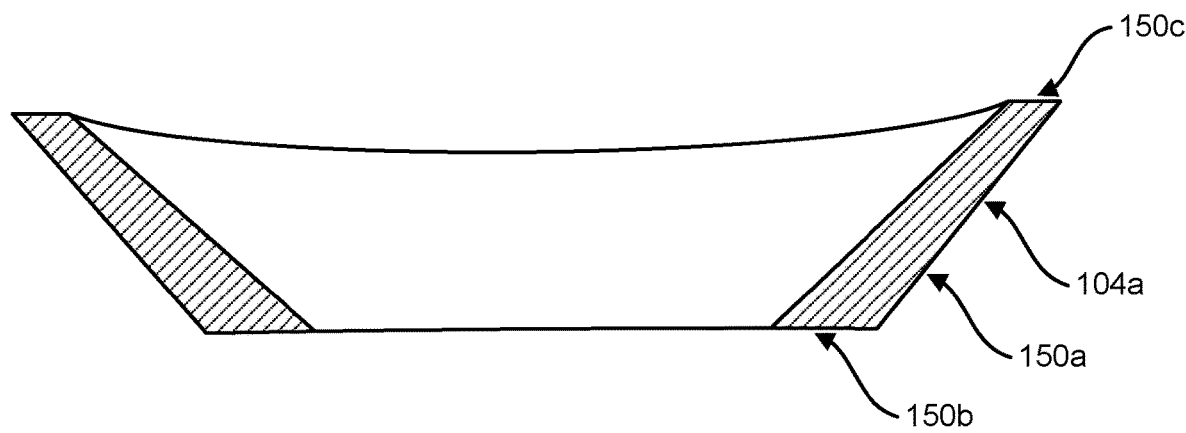
Figure 17:
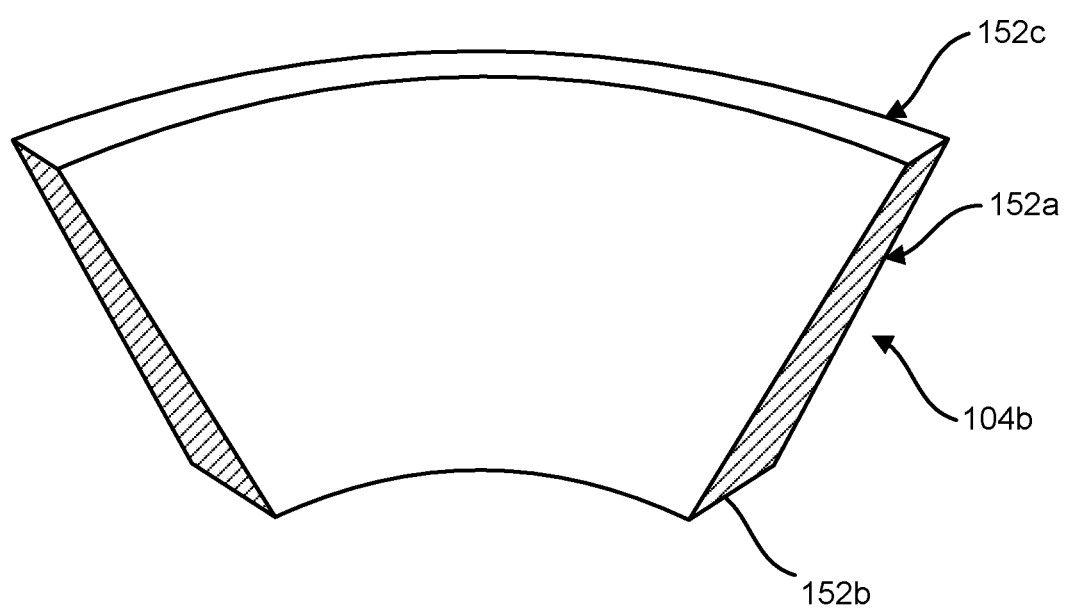
FIG. 17 shows an arcuate shaped solid coloring agent off this invention—more specifically, in this FIG. a quarter round solid coloring agent tablet is shown.
Figure 18:
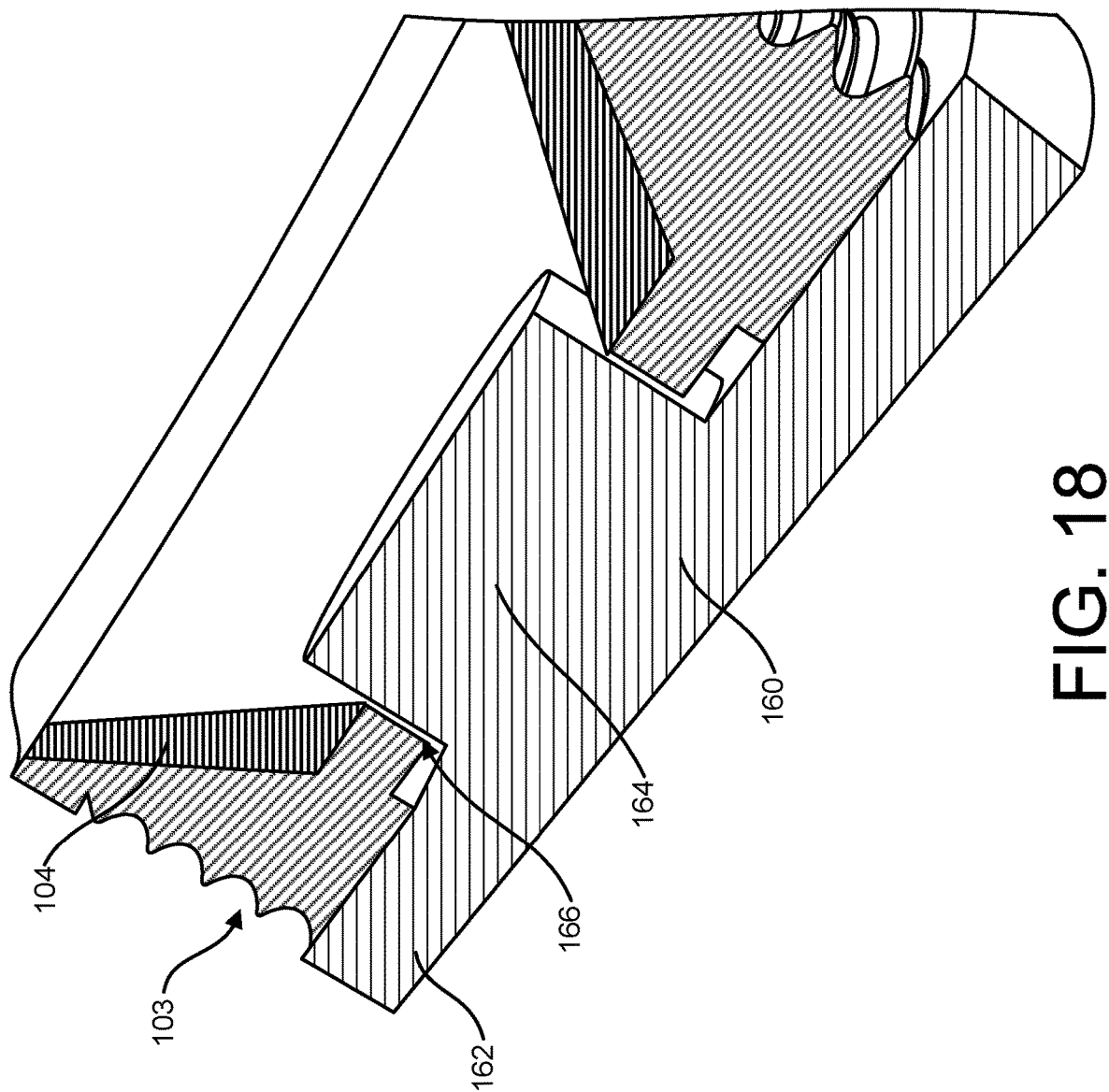
FIG. 18 shows a sectional view of a stand of this invention for use in inserting the coloring agent into the interface device and holding the coloring agent against undesired movement prior to engagement of the interface device and interface plug.
Figure 31:
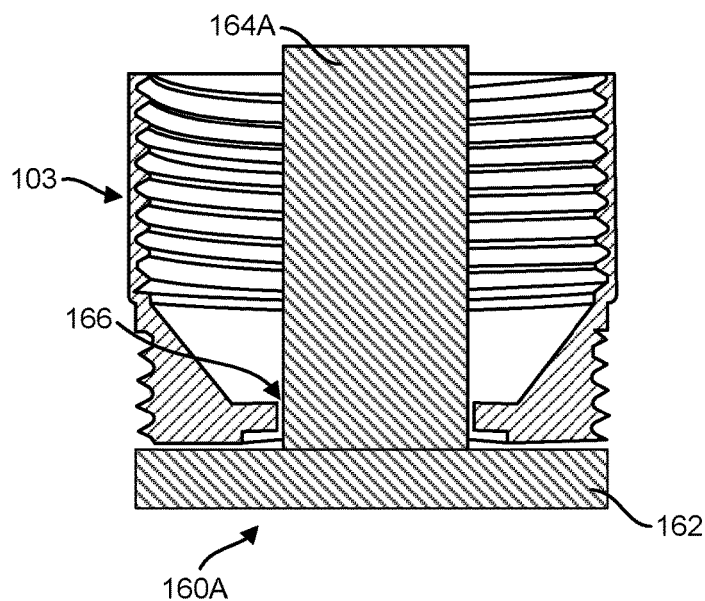

FIG. 31 is a modified version of the stand 160 of FIG. 18, in which the post 164A is elongated to permit easier insertion of the coloring agent within the interface device, irrespective of whether the coloring agent is a solid annular coloring ring shown in FIGS. 16A, 16B and 16C, solid arcuate coloring tablets shown in FIG. 17, or a carrier shown in FIG. 26, 29 or 30.

DETAILED DESCRIPTION OF THE INVENTION

The apparatus of this invention can be used with a variety of viscous foodstuffs, including icing or frosting, to decorate a variety of foods, such as cakes, cookies, canapés, pastry cups, meringue, etc.

The apparatus is an interface device, which is interposed between a coupler plug inserted into a pastry bag and a mating coupler collar, and which carries a coloring agent which applies color to the outer surface of material being expelled from the bag through the coupler and interposed interface device and out through a nozzle attached to the interface device by the mating coupler collar. The construction of the internal wall of the interface device can be the same as the construction of the internal wall of the nozzle covered by the Parent Filings, vis-à-vis the structure which is provided for carrying solid coloring agents. There is, however, no treatment means at the second end of the interface device as with the nozzle covered by the Parent Filings. If desired, such treatment means are provided by means of a separate nozzle which is attached to the interface device by a mating interface collar, such as the nozzle shown in FIG. 1, modified in the manner shown in FIG. 10.

Figure 10:
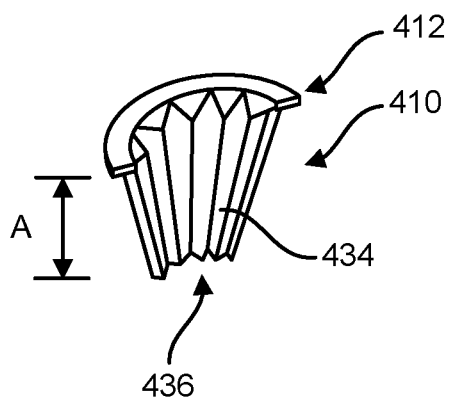
FIG. 10 is a prospective sectional view of the nozzle of FIG. 1, with a flange 412 for use with the interface device and interface collar of FIGS. 6 and 7 in lieu of the extender, traditional nozzle and extender collar shown in FIGS. 6 and 7.

FIG. 1 shows a cut away view of a nozzle 10 in accordance with the teachings of U.S. Pat. No. 8,794,959 that, once modified in accordance with the teachings of this invention, i.e., to incorporate a flange as shown in FIG. 10, can be used with the interface device of this invention. FIG. 1 shows the internal wall 32 of the nozzle 10 and the protrusion, serrations or ridges 34 that extend inwardly from the internal wall 32 and run longitudinally along the length of the nozzle 10, parallel to the conical axis 18. The ridges 34 within the nozzle 10 "treat" the food material (not shown) as it passes from the bag (not shown) through the nozzle 10 and out the opening 20. The nozzle 10 shown in FIG. 1 is made of a flexible material which can be "cut" with scissors at cut lines 10a, 10b, 10c or 10d to achieve a desired output opening size and, thus, a desired size of the food material that is output. Nozzles intended for use in this invention in a preferred embodiment are manufactured with the internal construction of the nozzle 10 of FIG. 1 with the "cut"

already made, i.e., each nozzle has a preset height to achieve a preset output opening and output size, such as the nozzle shown in FIG. 10.

FIG. 2 is a top plan view of a straight line of food material 880 expelled with a three-dimensional ribbon candy appearance. The food material 880 has channels 882 with peaks 884 and valleys 886, with a first color 888 on each of the channel peaks 884 and a second color 890 in each of the channel valleys 886.

The alternating stripes of color 888 and 890 on the peaks 884 and in the valleys 886 are produced by the ridges 34 of the nozzle 10 which treat the food material after color has been applied to the outer surface of the material by a coloring agent inserted into the interface device which is upstream of the nozzle. More specifically, the ridges 34 cut into the food material and expose inner portions of the food material, i.e., valleys 886, that have not contacted the coloring agent in the interface device and thus are non-colored portions 890, while at the same time the ridges 34 leave untouched outer portions of the food material, i.e., peaks 884, which have rubbed up against the coloring agent in the interface device and carry the surface color 888 as it is extruded out of the nozzle.

The "treatment" of the food material which occurs within the apparatus of this invention is unique and not possible to replicate with a DDB apparatus and is only possible with nozzles like those shown in FIGS. 1 and 10.

FIG. 3 and FIG. 4 show various unique decorating designs that can be produced when food material 880 is "treated" with nozzles like those shown in FIGS. 1 and 10 to yield a three-dimensional ribbon candy appearance that is not possible with a DDB apparatus.

FIG. 3 shows a stream of food material 880 produced with nozzles like those shown in FIGS. 1 and 10 with a three-dimensional ribbon candy appearance and, through the manipulation of the apparatus during expulsion, a "braid" design 894. A first "piece" of material 894*a* is expelled while moving the outlet of the nozzle from one side to the other and then back to and ending in the "center"—all the while making an "S" shape curve design. Then a second "piece" of material 894*b* is expelled with the same shape as the first, starting as if coming out of the side of the first, crossing over the "end" of the first and ending in the center in spaced relationship from the end of the first. Thereafter successive "pieces" of material 894*c* (etc.) are similarly produced to create a "braid" design.

FIG. 4 shows a stream of food material 880 produced with nozzles like those shown in FIGS. 1 and 10 with a three-dimensional ribbon candy appearance and, through the manipulation of the apparatus during expulsion, a horizontally undulating "scallop" design 896*a*.

Figure 5A:
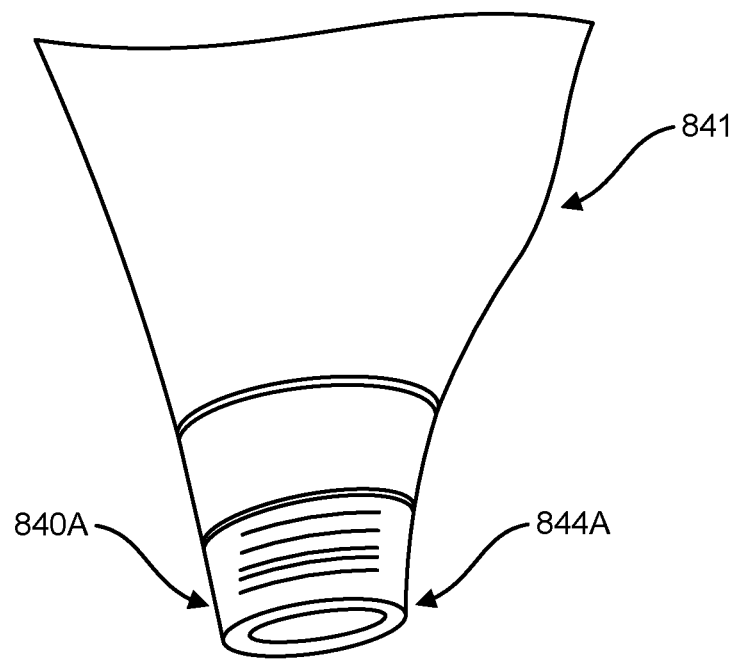
FIG. 5A shows a plug loaded within a pastry bag. The plug can be either a traditional DDB coupler plug or an interface plug of this invention. The plug can be inserted into the pastry bag by the consumer before the consumer inserts frosting into the bag. Alternatively, at the point of manufacture, the plug can be inserted into the bag, the frosting can then be inserted, and the bag can be sealed at both ends, as is done with the commercially available Pillsbury "Filled Pastry Bag."

FIG. 5A shows a plug 840A inserted into a pastry bag 841 and having external threads 844A. The plug can be either a traditional DDB coupler plug or an interface plug of this invention. The plug can be inserted into the pastry bag by the consumer before the consumer inserts frosting into the bag. Alternatively, at the point of manufacture, the plug can be inserted into the bag, the frosting can then be inserted, and the bag can be sealed at both ends, as is done with the commercially available Pillsbury "Filled Pastry Bag."

Figure 5B:
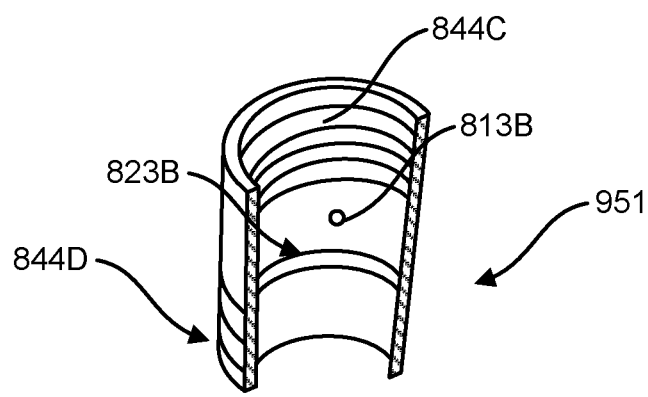
FIG. 5B shows an interface device of this invention. The interface device has an annular shelf defining a seat for receiving a coloring agent. The coloring agent (not shown) is inserted into the interface device, the interface device is attached to the plug seen in FIG. 5A, and a conventional nozzle (not shown) is attached to the interface device using a traditional DDB coupler collar (not shown) or a nozzle of this invention (not shown) is attached to the interface device using an interface collar of this invention (not shown).

FIG. 5B shows an interface device 951 of this invention having internal threads 844C which are designed to threadably engage with the external threads 844A of the plug 840A. The interface device 951 has an internal wall 813B having a shelf 823B on which the coloring agent of this invention can be seated. The interface device 951 further includes external threads 844D on which either a traditional DDB mating collar (not shown) or an interface collar of this invention (not shown) can be mounted.

FIGS. 6 and 7 show a traditional DDB pastry bag 101 into which has been inserted an interface plug 102 of this invention. Attached to the interface plug 102 is an interface device 103 of this invention. The interface plug 102 and the interface device 103 cooperatively hold therebetween a coloring agent 104 of this invention. A mating interface collar 105 of this invention is attached to the interface device 103. The interface collar 105 is used to affix an extender 106 of this invention to the interface device 103. A mating extender collar 107 of this invention is attached to the extender 106, with the extender collar 107 and the extender 106 cooperatively holding therebetween a conventional nozzle 108.

The interface plug 102 can be inserted into the bag 101 by the consumer, who then inserts frosting (not shown) into the bag. Alternatively, at the point of manufacture, the interface plug 102 can be inserted into the bag 101, the frosting (not shown) can then be inserted into the bag 101, and the bag 101 can be sealed at both ends, until the seal at the end covering the interface plug 102 is broken, similar to the manner in which the commercially available Pillsbury "Filled Pastry Bag" seals a tip (rather than the interface device 102) into a pastry bag filled with frosting.

Figure 8A:
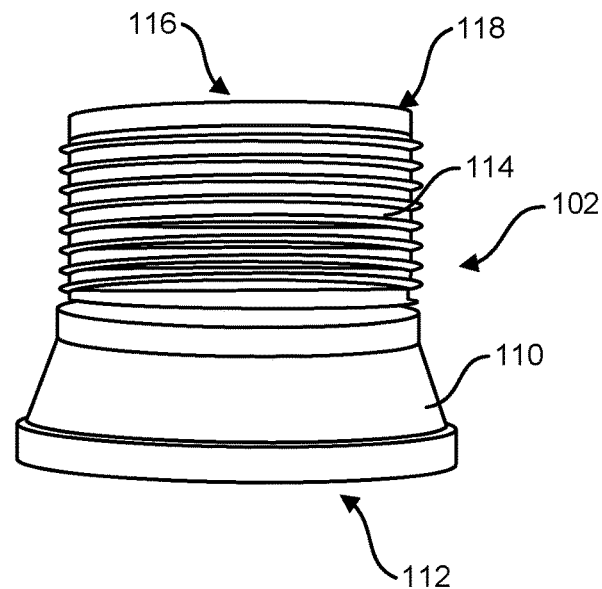
FIGS. 8A, 8B and 8C, respectively, show a side view, a prospective view, and a sectional view of the interface plug of this invention shown in FIGS. 6 and 7.
Figure 8B:
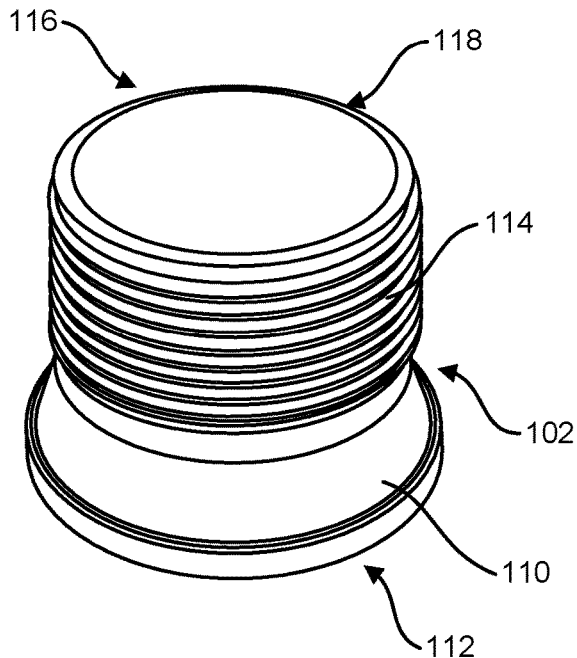
Figure 8C:
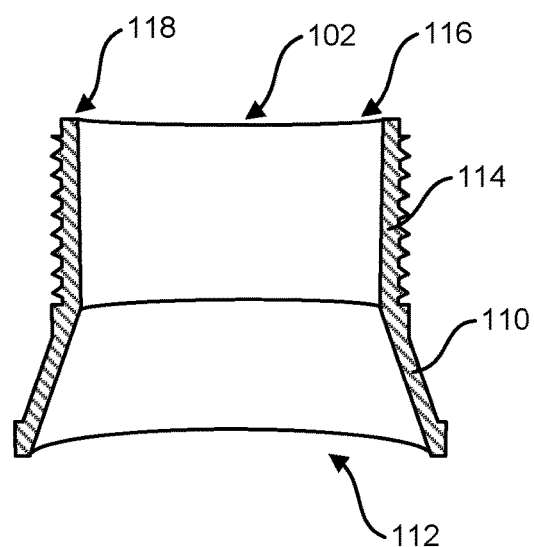

FIGS. 8A, 8B and 8C show the interface plug 102 of this invention. The interface plug 102 is similar in concept to traditional DDB coupler plugs, i.e., it has a frustoconical shape 110 at one end 112 and an externally threaded portion 114 at the other end 116. A novel and unique difference of the interface plug 102 is the compression surface 118, which is designed, when the interface device 103 is threadably engaged onto the interface plug 102, to press upon the coloring agent 104 and thereby hold the coloring agent 104 in the interface device 103.

Figure 9B:
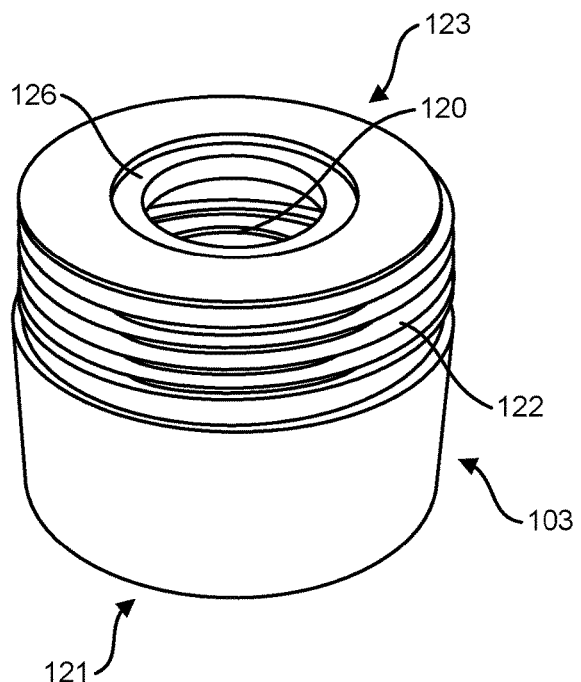
Figure 9C:
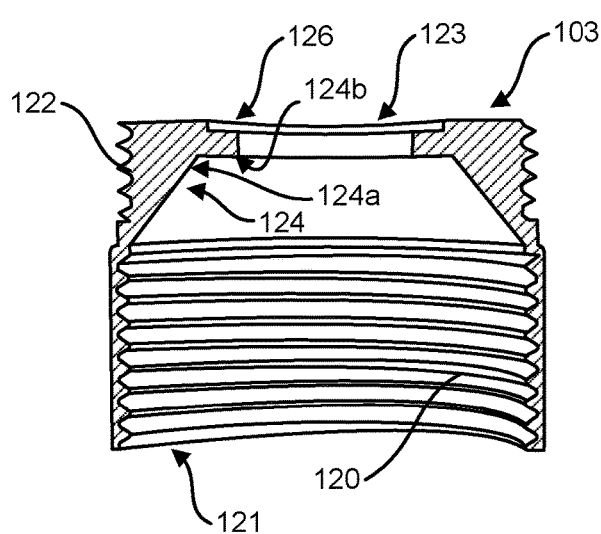

FIGS. 9A, 9B and 9C show the interface device 103 of this invention. The interface device 103 is, in its entirety, novel and unique. The interface device 103 has internal threads 120 at one end 121 which are dimensioned to threadably engage with the external threads 114 of the interface plug 102. The interface device 103 also has external threads 122 at the other end 123 for attachment of the interface collar 105 to the interface device 103. The internal wall 124 of the interface device 103 in the area of end 123 includes a tapered surface 124*a* and a shelf surface 124*b*, where the shelf surface 124*b* is analogous to the shelf 823B of the interface device 951 of FIG. 5B.

When the interface device 103 is threadably attached to the interface plug 102, the three surfaces, namely, the compression surface 118 of the interface plug 102 and the tapered surface 124*a* and shelf surface 124*b* of the interface device 103 cooperate to hold therebetween the coloring agent 104 once inserted therein.

An external seat 126 is provided at end 123 of the interface device 103. The seat 126 permits the extender 106 or the nozzle 410 shown in FIG. 10 to be affixedly secured to the interface device 103 when the interface collar 105 is threadably attached to the interface device 103.

FIG. 10 shows the nozzle 410 of this invention. Nozzle 410 has ridges 434, analogous to the ridges 34 of nozzle 10 in FIG. 1. The nozzle 410 has a flange 412. The flange 412 permits the nozzle 410 to be affixedly secured to the interface device 103 in the same manner as the extender 106. The nozzle 10 of FIG. 1 is made of a flexible material and can be "cut" to achieve a desired output opening size and, thus, a desired size of food material output. Such a flexible nozzle, if modified in accordance with the teachings of FIG. 10, could be used with the other elements of this invention. However, in the preferred embodiment, the nozzle that would be used would be a nozzle constructed in the manner shown in FIG. 10, with a height of "A." The larger the height "A," the smaller the size of the output opening 436, resulting in a smaller output of food material. Conversely, the smaller the height "A," the larger the size of the output opening 436, resulting in a larger output of food material.

Figure 11A:
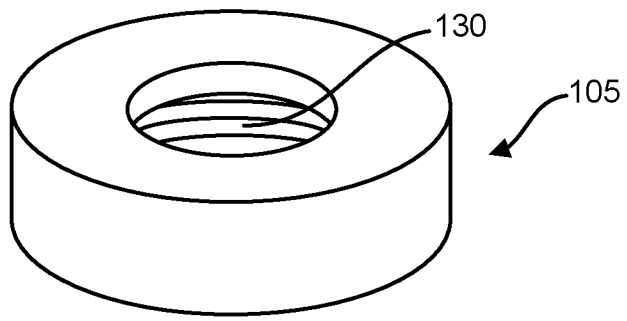
FIGS. 11A and 11B, respectively, show a prospective view and a sectional view of the interface collar of this invention shown in FIGS. 6 and 7.
Figure 11B:
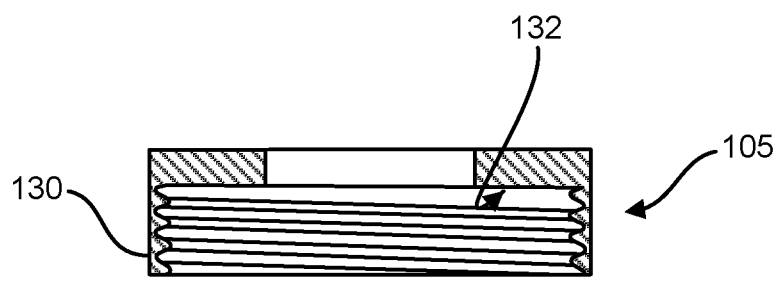

FIGS. 11A and 11B show the interface collar 105 of this invention. The interface collar 105 is configured to affixedly secure either the nozzle 410 or the extender 106 to the interface device 103. The interface collar 105 includes internal threads 130, adapted to threadably engage the external threads 122 of the interface device 103, and an internal surface 132. The internal surface 132 of the interface collar 105 cooperatively works with the seat 126 of the interface device 103 after either a flange of the extender (as shown and discussed below in connection with FIGS. 12A, 12B and 12C) or the flange 412 of the nozzle 410 discussed above is inserted into the seat 126 and the interface collar 105 is threadably engaged to the interface device 103.

Figure 12A:
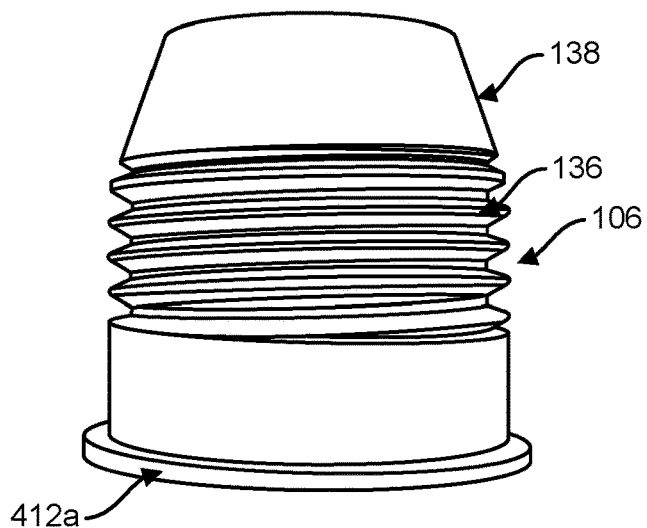
FIGS. 12A, 12B and 12C, respectively, show a side view, a prospective view and a sectional view of the extender of this invention shown in FIGS. 6 and 7.
Figure 12B:
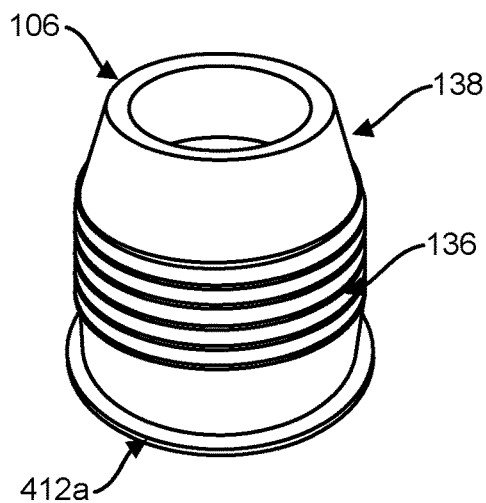
Figure 12C:
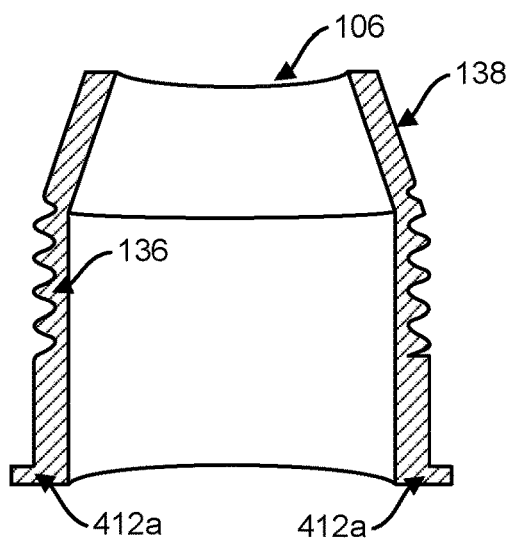

FIGS. 12A, 12B and 12C show the extender 106 of this invention. The extender 106 includes a flange 412a which is analogous to the flange 412 of the nozzle 410 shown in FIG. 10. Flange 412a, like flange 412, is adapted to fit into seat 126 of the interface device 103, when the extender 106 is affixedly attached to the interface device 103 by the interface collar 105. The extender 106 includes an external thread 136 for attachment of an extender collar 107 and an external tapered wall 138. The extender 106 and extender collar 107 threadably engage together to hold therebetween a commercially available conventional nozzle 108 selected by the user (not shown in FIGS. 12A, 12B and 12C but shown in FIGS. 6 and 7), as more fully described below.

Figure 13A:
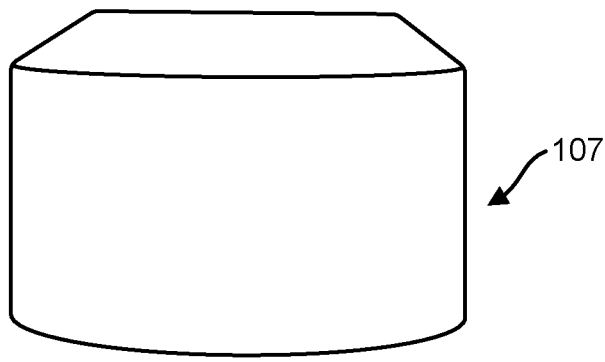
FIGS. 13A, 13B and 13C, respectively, show a side view, a prospective view and a sectional view of the extender collar of this invention shown in FIGS. 6 and 7.
Figure 13B:
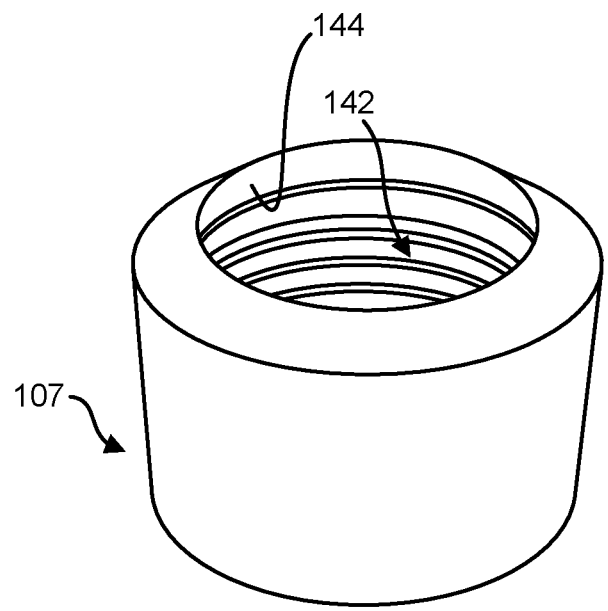
Figure 13C:
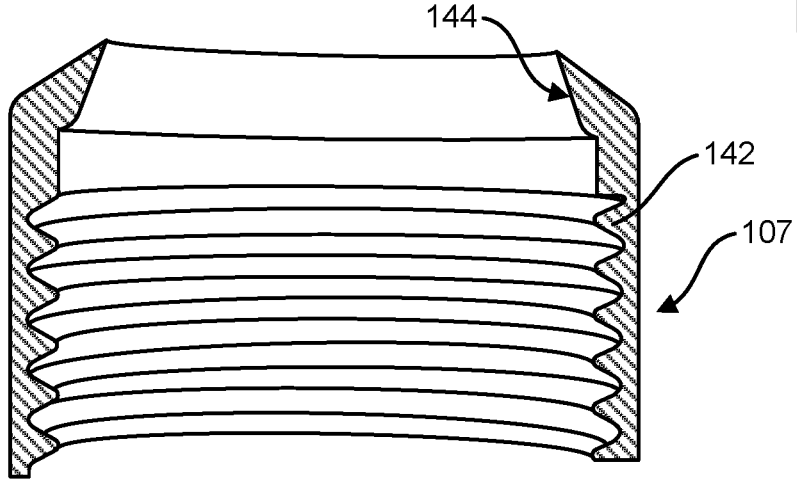

FIGS. 13A, 13B and 13C show the extender collar 107 of this invention. The extender collar 107 cooperates with the extender 106 to attach a conventional nozzle 108 to the interface device 103. The extender collar 107 includes internal threads 142 which threadably engage with the external threads 136 of the extender 106. The extender collar has an internal tampered wall 144 which cooperates with the external tapered wall 138 of the extender 106 when the extender collar 107 is threadably engaged to the extender 106 to sandwich and hold the nozzle 108 selected by the user therebetween.

Figure 15:
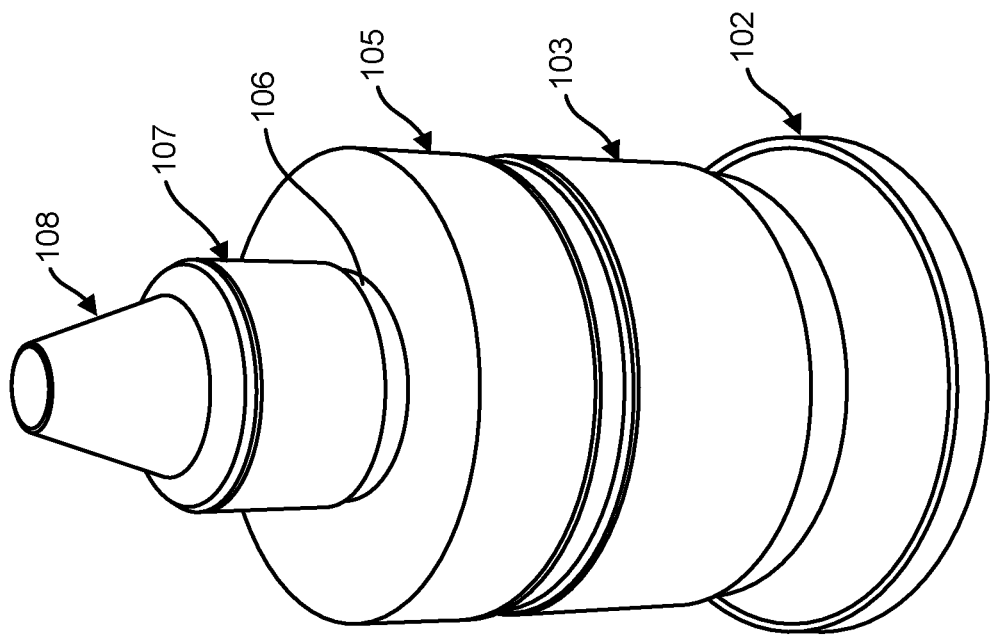
FIG. 15 is a perspective assembled view of the elements of this invention shown in FIGS. 6 and 7.
Figure 14:
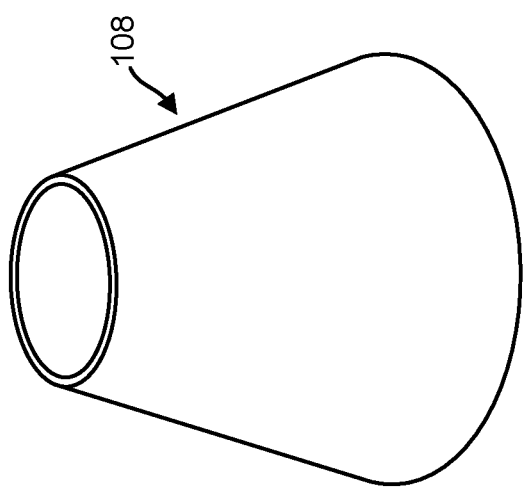
FIG. 14 shows a perspective view of a traditional nozzle used with this invention in the manner shown in FIGS. 6 and 7.

FIG. 14 shows a conventional commercially available nozzle 108 of the type that can be used with the extender 106 and extender collar 107, as shown in FIG. 15.

FIG. 15 shows an assemblage of the various elements of this invention, namely, an interface plug 102, an interface device 103, an interface collar 105, an extender 106 and an extender collar 107, together with a conventional nozzle 108.

FIGS. 16A, 16B and 16C show one version of the coloring agent 104, namely, a solid annular ring 104a having a frustoconical shape. The frustoconical shape allows the annular ring 104a to be fittingly inserted into the interface device 103. When inserted, the tapered outer surface 150a and the shelf abutting surface 150b of the frustoconical shaped ring 104a contact, respectively, the tapered surface 124a and the shelf surface 124b of the interface device 103. When the interface plug 102 is subsequently threadably engaged to the interface device 103, the compression surface 150c of the frustoconical shaped ring 104a contacts the compression surface 118 of the interface plug 102. This interaction of the various surfaces of the frustoconical shaped ring 104a, the interface device 103 and the interface plug 102 causes the frustoconical shaped ring 104a to be "lockingly" secured in place in the interface device 103.

FIG. 17 shows the coloring agent 104 in the form of a solid, arcuate quarter round chip (or tablet) 104b. The chip (or tablet) is one fourth of the frustoconical shaped ring 104a. The shape of the chip (or tablet) 104b allows four of the chips (or tablets) to be fittingly inserted into the interface device 103. When inserted, the tapered outer surface 152a and the shelf abutting surface 152b of the chip (or tablet) 104b contact, respectively, the tapered surface 124a and the shelf surface 124b of the interface device 103. When the interface plug 102 is subsequently threadably engaged to the interface device 103, the compression surface 152c of the chip (or tablet) 104b contacts the compression surface 118 of the interface plug 102. This interaction of the various surfaces of the chips (or tablets) 104b, the interface device 103 and the interface plug 102 causes the chips (or tablets) 104b to be "lockingly" secured in place in the interface device 103.

FIG. 18 shows a stand 160 for use with the interface device 103, the coloring agent 104 and the interface plug 102 (not shown) of this invention. The stand 160 has a base 162 and an upstanding post 164. The interface device 103 is loosely placed on the stand 160, i.e., the post 164 is purposefully designed so that there is a "gap" 166 between the interface device 103 and the post 164 when the interface device 103 is placed on the stand 160. The interface device 103 is slidingly placed on the post 164 of the stand 160 when the stand 160 is resting on its base 162. The coloring agent 104, regardless of whether a ring 104a or four quarter round chips (or tablets) 104b are inserted into the interface device 103 guided by the post 164. The interface plug 102 (not shown in FIG. 18) is then threadably engaged to the interface device 103, causing the aforementioned "locking" and securing of the coloring agent 104 inside the interface device 103. The assemblage of the interface device 103, the coloring agent 104 and the interface plug 102 are then lifted "as one" off of the stand 160.

Figure 19:
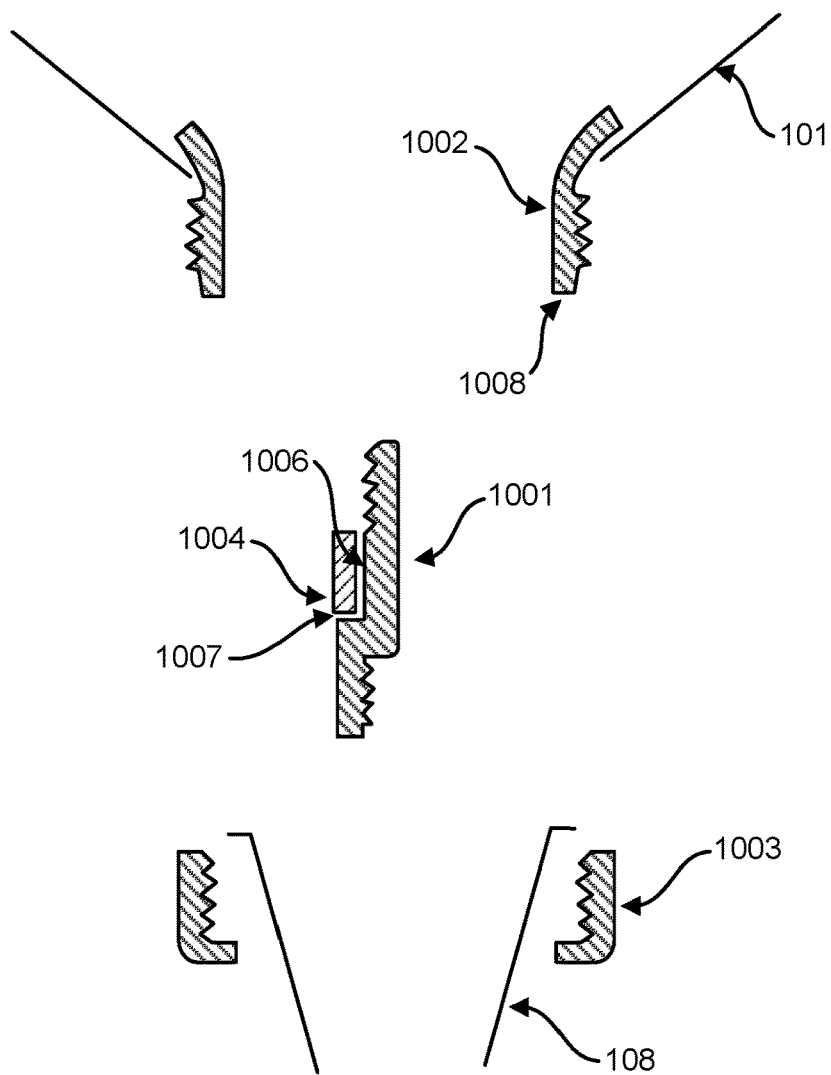
FIG. 19 is an exploded sectional view of a one-piece interface device of this invention, for use with a traditional DDB coupler plug and coupler collar, after insertion of solid, arcuate, quarter round coloring tablets (or chips), in the manner shown, wherein such tablets (or chips) are cylindrical in shape rather than frustoconical as shown in FIG. 17.

FIG. 19 shows a one-piece interface device 1001 according to this invention designed to be interposed between the two elements of a traditional DDB apparatus, namely, the coupler plug 1002 and coupler collar 1003. FIG. 19 depicts use with a solid, quarter-round cylindrical shaped coloring tablet 1004, shown as part of the exploded view and shown separately in FIG. 19A. The traditional coupler plug 1002 is inserted into the bag 101. The coloring tablet 1004 is seated on seat 1007 of the interface device 1001, resting against the internal wall 1006 of the interface device 1001. When the interface device 1001 is threadably engaged to the coupler plug 1002, the outer surface 1008 pushes against the tablet 1004, thereby holding the tablet in place on the seat 1007 and against the internal wall 1006. The traditional nozzle 108 is attached to the interface device 1001 with the coupler collar 1003. The width W and height Y of the coloring tablet 1004 are dimensioned to achieve the desired amount of coloring of frosting or icing as it passes through the overall apparatus and simultaneously the desired smooth and efficient flow of the food material.

Figure 19A:
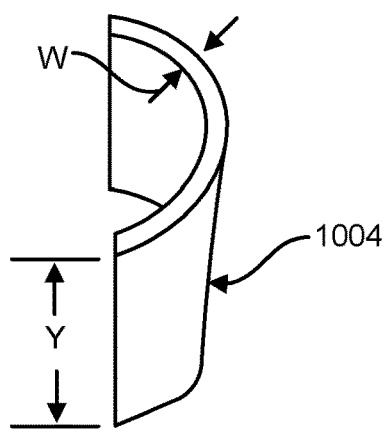
FIG. 19A is a perspective view of the solid, arcuate, quarter round coloring tablet shown in use in FIG. 19.

The tablet 1004 of FIGS. 19 and 19A can be a quarter round, as shown, such that four tablets would be required in use. Alternatively, without departing from the teachings of this invention, the tablet 1004 can be of some other dimension, e.g., 1/n round, so that "n" pieces are required in use. In both cases, the tablet 1004 has a height Y and a thickness W, and is held in place against the internal wall 1006 of the interface device 1001 by the engaging interaction of the seat 1007 and internal wall 1006 on the interface device 1001 and the end surface 1008 of the coupler plug 1002.

Figure 20:
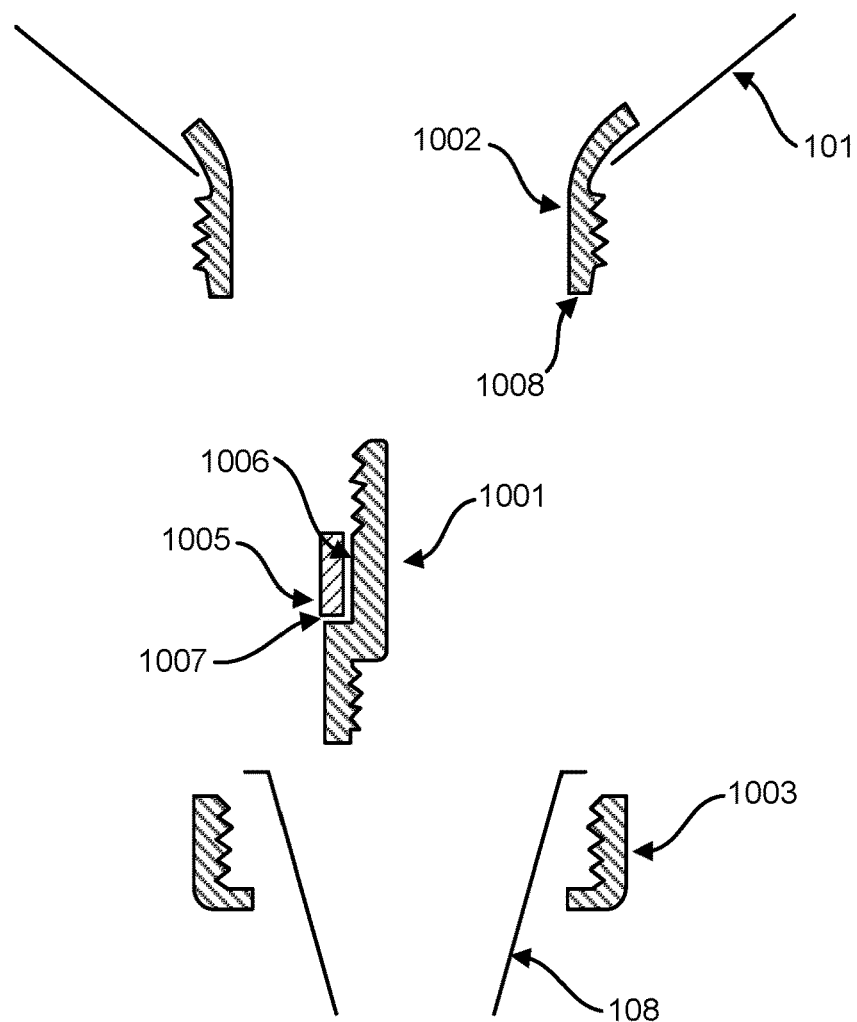
FIG. 20 is an exploded sectional view of a one-piece interface device of this invention, for use with a traditional DDB coupler plug and coupler collar, after insertion of a solid annular coloring ring, in the manner shown, wherein such solid annular ring is cylindrical in shape rather than frustoconical as shown in FIGS. 16A, 16B and 16C.
Figure 20A:
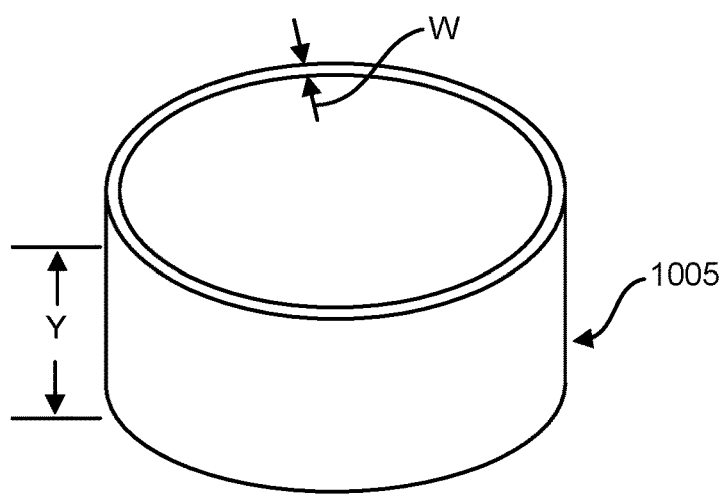
FIG. 20A is a perspective view of the one-piece solid annular color ring shown in use in FIG. 20.

FIG. 20 shows a one-piece interface device 1001 according to this invention designed to be interposed between the two elements of a traditional DDB apparatus, namely, the coupler plug 1002 and coupler collar 1003. FIG. 20 depicts use with a solid, annular cylindrical shaped ring 1005, shown as part of the exploded view and shown separately in FIG. 20A. The traditional coupler plug 1002 is inserted into the bag 101. The coloring ring 1005 is seated on seat 1007 of the interface device 1001, resting against the internal wall 1006 of the interface device 1001. When the interface device 1001 is threadably engaged to the coupler plug 1002, the outer surface 1008 pushes against the ring 1005, thereby holding the ring in place on the seat 1007 and against the internal wall 1006. The traditional nozzle 108 is attached to the interface device 1001 with the coupler collar 1003. The width W and height Y of the annular, cylindrical shaped coloring ring 1005 (best seen in FIG. 20A) are dimensioned to achieve the desired amount of coloring of frosting or icing as it passes through the overall apparatus and the desired smooth and efficient flow of the food material.

FIGS. 21 and 22 show a one-piece interface device 1010 according to this invention designed to be attached to a modified version of a traditional DDB coupler plug 1011 sold by August Thomsen Corporation ("Ateco"). The Ateco coupler plug 1011 is modified to remove fins (not shown) leaving a flat end 1012 with an annular inner lip 1013. A solid, arcuate color tablet 1014 (as shown) or, alternatively, a solid, annular color ring (not shown), is loaded into the interface device with a first end 1015 resting on a seat 1016 in the interface device 1010. In both cases, the tablet 1014 or ring has a notch 1017 in the surface of the second end 1018. The tablet 1014 or ring is held in place against the internal wall 1019 of the interface device 1010 by the engaging interaction of: (i) the seat 1016 of the interface device 1010 and the end surface 1015 of the tablet 1014; and (ii) the flat end 1012 and annular inner lip 1013 of the plug 1011 and the second end 1018 and notch 1017 of the tablet 1014. After the interface device 1010 is attached to the coupler plug 1011, a traditional DDB coupler collar (not shown) is attached to the interface device 1010 to affix a nozzle (also not shown) to the interface device 1010, all in a manner known in the art.

Figure 23A:
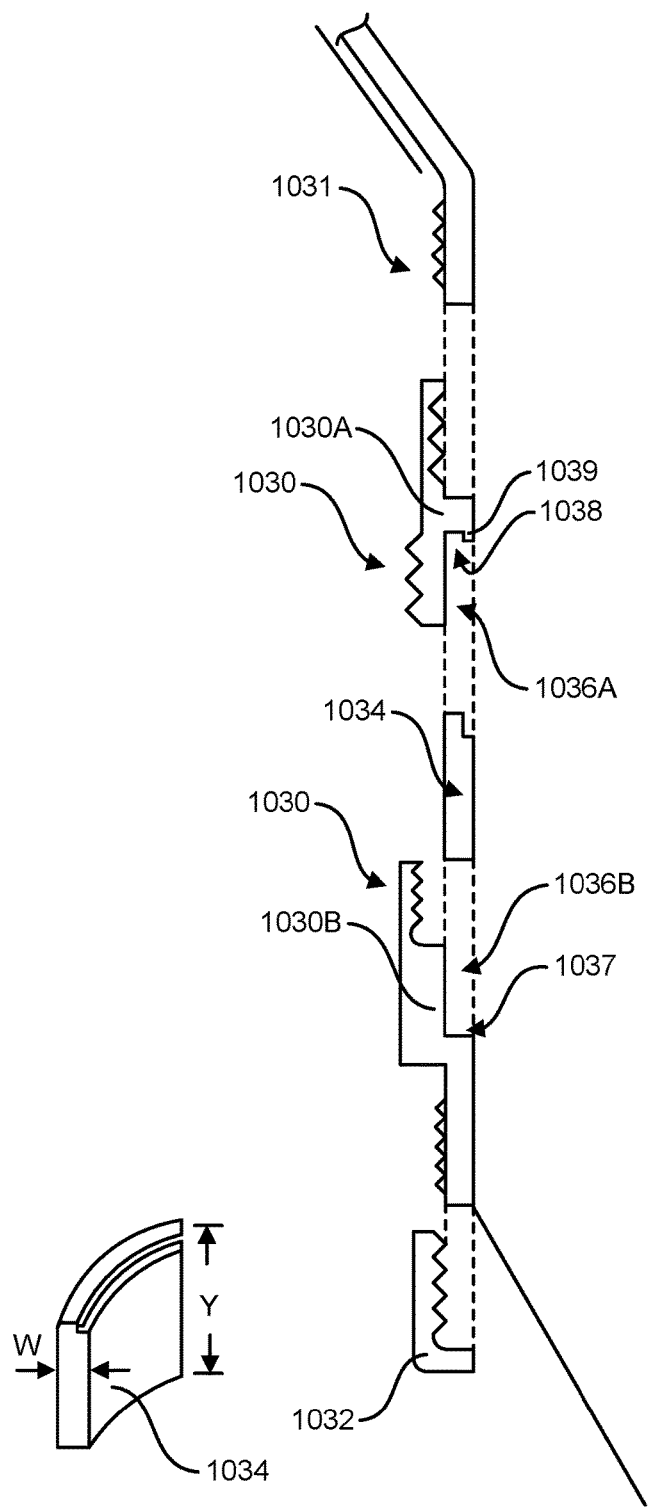
FIG. 23A is a perspective view of the notched, solid, quarter round coloring tablet shown in use in FIG. 23.
Figure 23:
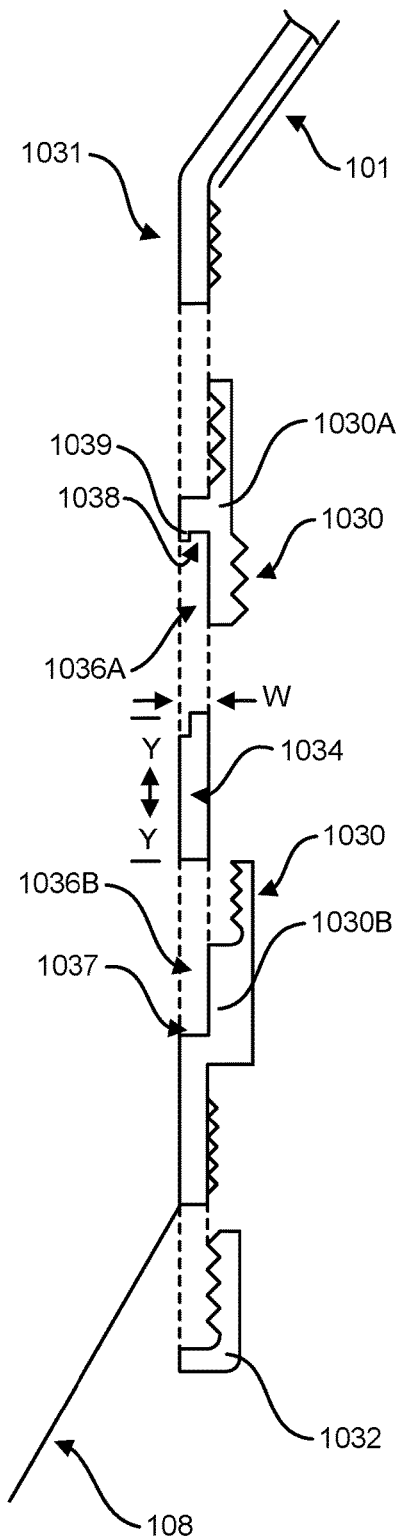
FIG. 23 is an exploded sectional view of a two-piece interface device of this invention for use with a traditional DDB coupler plug and coupler collar, which interface device has a seat on the first piece and an opposing surface with a retention finger on the second piece, which cooperate to securely retain the solid quarter round coloring tablets upon insertion, which solid tablets are notched to engage such retention finger in the manner shown.

FIG. 23 shows an interface device 1030 according to this invention having two pieces 1030A and 1030B designed to be interposed between the two elements of a traditional DDB apparatus, namely, the coupler plug 1031 (inserted in the bag 101) and coupler collar 1032 (which effectuates attachment of a nozzle 108 to the interface device 1030), in the manner shown. FIG. 23 depicts use with a solid, arcuate, cylindrical shaped color tablets 1034 which have a notch like notch 1017 of FIGS. 21 and 22. The tablets 1034 are shown as part of the exploded view in FIG. 23 and separately in FIG. 23A. It should be understood that the invention could be practiced with an annular ring (not shown). The tablet 1034 can be a quarter round, as shown, such that four tablets would be required in use. Alternatively, without departing from the teachings of this invention, the tablet 1034 can be of some other dimension, e.g., 1/n round, so that "n" pieces are required in use. In all cases, the tablet 1034 (or ring as the case may be), is held in place against the internal walls 1036A and 1036B of parts 1030A and 1030B of the interface device by the engaging interaction of the seat 1037 on one part 1030B of the interface device 1030 and the cover surface 1038 and retention finger 1039 (which is analogous to the annular lip 1013 in FIG. 21) on the other part 1030A of the interface device 1030. Here again, the width W and height Y of the coloring tablet 1034 are dimensioned to achieve the desired amount of coloring of frosting or icing as it passes through the overall apparatus and the desired smooth and efficient flow of the food material.

Figure 24:
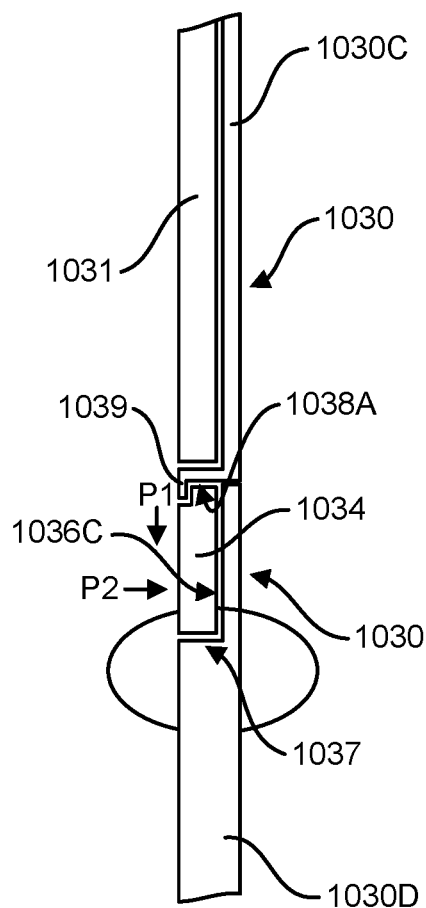
FIG. 24 is a sectional view of a portion of the two-piece interface device of this invention shown in FIG. 23, assembled with a solid coloring tablet or solid annular ring in engagement with the seat, opposing surface and retaining finger and, further, showing the forces P1 and P2 which are applied on the solid tablet or solid ring by the flowing food material, which forces P1 and P2 serve to assist retention of the solid tablet or solid ring against movement. The two-piece interface device is modified from what is shown in FIG. 23 in that the back support for the solid tablet is provided exclusively by only one piece of the two-piece interface device.

FIG. 24 is an enlarged view of a modified version of the interface device 1030 shown in FIG. 23 having pieces 1030C and 1030D. The back support for the tablet 1034 is provided exclusively by the internal wall of only one piece of the two-piece interface device, namely, internal wall 1036C of piece 1030D. The interacting portions of the two-piece interface device 1030 of FIG. 24 which hold the color tablet 1034 in place against the internal wall 1036C of part 1030D are the seat 1037 on part 1030D and opposing surface 1038 and retention finger 1039 on part 1030C. FIG. 24 also depicts the flow of the food material, e.g., icing or frosting, and the forces P1 and P2 applied to the color tablet 1034 (or ring).

FIG. 25A is a blow up of a modified version of the portion of FIG. 24 which is encircled, namely, FIG. 25A shows a modified seat 1037A on modified part 1030E and a modified version of the color tablet (or ring) 1034A. The designs of the modified seat 1037A and the modified color tablet (or ring) 1034A take into consideration: (i) the natural tendency of the coloring agent 1034A to remain on the seat 1037A due to the forces P1 and P2 from the flow of frosting; and (ii) the desire to enhance the smooth flow of the food material as the coloring agent is worn down, i.e., as its thickness is reduced.

FIGS. 25B and 25C are blow ups of further modified versions of the portion of FIG. 24 which is encircled. Each shows a modified version of piece 1030C of the two-piece interface device 1030, namely, piece 1030F in which the retention finger 1039 is eliminated and opposing surface 1038 is replaced with a slanted face 1038A. FIG. 25B shows a modified seat 1037B on part 1030G and a modified version of the color tablet (or ring) 1034B. FIG. 25C shows a modified seat 1037C on part 1030H and a modified version of the color tablet (or ring) 1034C. These changes take into consideration not only: (i) the natural tendency of the coloring agents 1034B and 1034C to respectively remain on the seats 1037B and 1037C due to the forces P1 and P2 from the flow of frosting; and (ii) the desire to enhance the smooth flow of the food material as the coloring agent is worn down, i.e., as its thickness is reduced; but also (iii) the desire to have the depletion of the coloring agent occur in a "controlled" fashion, i.e., so that the coloring agent is effective in applying color to the food material until such time as the entirety of the coloring agent is used up.

As noted, the coloring agent in one embodiment can be a solid in the shape of an annular ring or in the shape of multiple arcuate/"partial" rounds (e.g., four quarter rounds so that four tablets are used at once to completely line the inside of the apparatus, etc.).

In an alternative embodiment, the coloring agent is not a solid in the shape of an annular ring or multiple arcuate/"partial" rounds, but rather, is a viscous material deposited in either a cavity in an annular carrier or in multiple cavities in multiple arcuate/"partial" round carriers.

Thus, it is to be understood that, in lieu of the solid coloring agents described in connection with FIGS. 19-25C, a viscous coloring agent in an appropriately shaped carrier could be employed.

FIG. 26 is a carrier 1101 for a viscous coloring agent. The carrier 1101 has two axial sides 1102 and 1103 and two end sides 1104 and 1105, having walls 1106, 1107, 1108 and 1109, respectively. The carrier 1101 has a back wall 1110. The walls 1106, 1107, 1108, 1109 and 1110 define a cavity

1111. The cavity 1111 is in the shape of either the solid annular coloring ring or the arcuate coloring tablet respectively shown in FIGS. 16A, 16B and 16C or FIG. 17 and is filled with viscous coloring material (not shown).

FIG. 27 is a modified version of the carrier of FIG. 26. The cavity of carrier 1101A is the same dimensions as the cavity 1111 of carrier 1101 of FIG. 26. The cavity of carrier 1101A is not, however, defined by an external back wall like back wall 1110 of carrier 1111. Rather, the cavity of carrier 1101A is defined by an internal wall 1110A in the same shape as the back wall 1110 of carrier 1101. The shape of the viscous coloring material 1140A that is loaded into the cavity of carrier 1101A is the same as the shape of the either the solid annular coloring ring or the arcuate coloring tablet respectively shown in FIGS. 16A, 16B and 16C and FIG. 17. The carrier 1101A has a squared off back wall 1123A and bottom wall 1124A which facilitate insertion of the carrier 1110A into the modified interface device 103A shown in FIG. 28 (discussed below).

FIG. 27A is a modified version of the carrier of FIG. 27. The internal wall 1110B of carrier 1101B is similar to the shape of wall 1037B of FIG. 25B, such that the coloring material deposited into the cavity in carrier 1101B has the same shape as the annular coloring ring or arcuate coloring tablets shown in FIG. 25B. The carrier 1101B also has a squared off back wall 1123B and bottom wall 1124B which facilitate insertion of the carrier 1101B into the modified interface device 103A shown in FIG. 28 (discussed below)

FIG. 27B is a modified version of the carrier of FIG. 27. The internal wall 1110C of carrier 1101C is similar to the shape of wall 1037C of FIG. 25C, such that the coloring material deposited into the cavity in carrier 1101C has the same shape as the annular coloring ring or arcuate coloring tablets shown in FIG. 25C. The carrier 1101C also has a squared off back wall 1123C and bottom wall 1124C which facilitate insertion of the carrier 1101C into the modified interface device 103A shown in FIG. 28 (discussed below)

FIG. 28 is a modified version of the interface device of FIGS. 6, 7, and 9A, B and C. Interface device 103A has internal walls 1121 and 1122 adapted to easily receive and hold the carriers of FIG. 27, 27A or 27B. Interface device 103A also has a seat 126A for receiving and retaining either the nozzle 1110 or the extender FIG. 29 is a modified version of the carrier of FIG. 26, namely, an annular carrier 1201 having four separate arcuate cavities 1202A, 1202B, 1202C and 1202D which can receive four separate and distinct viscous coloring agents (not shown), each cavity being defined by a back wall, 1203A, 1203B, 1203C and 1203D, respectively, axial end walls 1106 and 1107 (four components—one for each cavity—not individually numbered) and divider walls 1220A, 1220B, 1220C (not shown) and 1220D.

FIG. 30 is a modified version of the carrier of FIG. 26, namely, a quarter-round carrier 1201A, which has a cavity 1211 which can receive a viscous coloring agent, and which has an outer dimension which is defined by axial walls 1106A and 1107A, back wall 1212 and divider or end walls 1220E and 1220F. The outer dimension of carrier 1201A allows it to be seated, along with three other similar quarter-round carriers, in a modified version of the carrier of FIG. 29, i.e., in which first axial side wall 1106 is eliminated so that the four carriers 1201A can be inserted in, i.e., dropped into, the modified carrier 1201.

FIG. 31 is a modified version of the stand 160 of FIG. 18, in which the post 164A is elongated to permit easier insertion of the coloring agent within the interface device 103, irrespective of whether the coloring agent is a solid annular coloring ring shown in FIGS. 16A, 16B and 16C, solid arcuate coloring tablets shown in FIG. 17, or a carrier shown in FIG. 26, 29 or 30.

Regardless of which embodiment is used, the coloring agent needs to be formulated such that the coloring agent is able to impart color to the food material when the coloring agent comes in contact with the food material, which optimally would be "off-the-shelf" frosting available at retail, e.g., frosting such as Duncan Hines® or Pillsbury® or Betty Crocker® brand frosting.

Significantly, from the Duncan Hines® brand frosting recipe one can deduce that such frosting is ~17% water. But such water is mostly bound by other ingredients in the frosting recipe. For example, by sugars, corn syrup, corn starch and polysorbate, making the water unavailable to dissolve colorant in the coloring agent. The coloring agent therefore must be formulated to take into account the fact that water is not available to "activate" the coloring agent.

The solution to the lack of available water lies in formulating the coloring agent to "color" the outside surface of the frosting, rather than to "mix" with the frosting. In other words, the coloring agent is not formulated to be "activated" by contact with the food material. Rather, the coloring agent is formulated to rub off on the outer surface of the food material as the outer surface of the food material brushes up against the coloring agent. The coloring agent achieves a topical application of color to the frosting.

Accordingly, in embodiments where the coloring agent is a solid, the primary component of the coloring agent is what the baking industry calls "luster dust" and/or "petal dust". These are dry powder color pigments (dyes or lakes) that are conventionally "brushed" onto fondant or gum paste on a cake with a paint brush, or "mixed" with water and airbrushed onto frosting on a cake, or "sprinkled"/"dusted" over any part of a cake.

There are two main types of tablets: (i) vitamin/nutraceutical type; and (ii) candy type. Tablets formed of the vitamin/nutraceutical type will be durable, i.e., designed not to easily break when jostled, but have been found to be less capable in effectuating color application.

It is believed that greater success can be achieved in practicing this invention with candy type tablets, i.e., tablets which will admittedly be more brittle, but which will be more capable of "breaking down" in use. For candy type tablets, the ingredients would include the following:

1) Color (powdered; typically dyes or lakes);
2) Binders (typically corn syrup, gelatin, gums); and
3) Lubricants (typically magnesium stearate, calcium stearate, stearic acid, amino acids, vegetable oil stearines).

In embodiments where the coloring agent is a viscous material deposited in the cavity of a carrier, the primary component of the coloring agent will again be dry powder color pigments (dyes or lakes), mixed with water. Potential other ingredients will include: Calcium Sulfate, Modified Cornstarch, Glycerine, Propylparaben, Propylene Glycol, Propylene Oxide Phosphoric Acid, Sodium Benzoate, Dextrose, Xanthan Gum and Soy Lecithin.

Regardless of which embodiment is used, i.e., regardless of whether the coloring agent is: (i) a solid in the shape of an annular ring; (ii) a solid in the shape of multiple arcuate/"partial" rounds (e.g., four quarter rounds so that four tablets are used at once to completely line the inside of the apparatus); (iii) a viscous material deposited in the cavity of an annular carrier; or (iv) a viscous material deposited in multiple cavities in multiple arcuate/"partial" round carriers; the coloring agent must be formulated so as to be capable of:

(a) "holding together" during shipping and handling, i.e., during insertion into the interface device of this invention (this is particularly true in the case of a solid coloring agent which must be able to retain its own structural integrity—unlike the viscous coloring agent which has the benefit of the carrier in which it resides and the sealing strip which is applied at the point of insertion into the carrier and remains in place until just before use; and (b) applying color to the surface of the food material (i.e., topically) as it rubs up against the coloring agent.

As is readily apparent to anyone skilled in the art of decorating, many multi-colored output designs, including with or without a ribbon candy appearance as described herein, that were heretofore not readily and conveniently possible with DDB devices are now possible through the novel design of the apparatus of this invention. Although some embodiments have been described with respect to a specific plastic nozzle, note that any embodiments might instead be associated with other types of nozzles (e.g., a non-disposable metal nozzle). While the preferred embodiments of the invention have been shown and described, it will be apparent to those skilled in the art that changes and modifications may be made therein without departing from the spirit of the invention, the scope of which is defined by the appended claims.

We claim:

1. An interface device assembled with: (i) a pastry bag into which frosting is loaded for application onto food items; (ii) a two-piece pastry bag coupler and collar; and (iii) a treatment nozzle which (a) is adapted to be attached to said pastry bag by said coupler and said collar; and (b) is configured to apply a shape to the frosting as said frosting is extruded through said treatment nozzle; wherein said interface device is interposed between said coupler and said collar, and wherein said interface device comprises an annular shaped coloring means configured to apply a color to an outside of the frosting as the frosting is extruded through said interface device; said interface device comprising:
  a body having:
    (a) a first end;
    (b) a second, distal end;
    (c) an internal wall disposed between said first and second ends;
    (d) the coloring means to be placed on said internal wall, interposed between said coupler and collar and locked in place there-between;
    (e) first means at said first end wherein said coupler attaches said first end to said pastry bag by said first means; and
    (f) second means at said second end wherein said collar attaches said second end to said nozzle by said second means.

2. The interface device of claim 1, wherein said interface device further comprises:
  (a) a seat on said internal wall; and
  (b) said coloring means is:
    (i) a coloring carrier designed to be placed on said seat; and
    (ii) a viscous coloring material deposited in said coloring carrier;
  whereby said coloring carrier into which said viscous coloring material has been deposited can be placed on said seat prior to extrusion of the frosting through said interface device.

3. The interface device of claim 1, wherein said interface device further comprises:
  (a) an arcuate seat on said internal wall; and
  (b) the annular shaped solid coloring material designed to be placed on said seat;
  whereby said solid coloring material can be placed on said seat prior to extrusion of the frosting through said interface device.

4. The interface device of claim 2, wherein said coloring carrier is comprised of two or more coloring carriers, each designed to carry said viscous coloring material deposited therein.

5. The interface device of claim 3, wherein said solid coloring material is comprised of two or more said solid coloring material pieces, each designed to be placed on said seat.

* * * * *